(12) United States Patent
Lovett et al.

(10) Patent No.: US 12,730,450 B2
(45) **Date of Patent: *Sep. 8, 2026**

(54) MAP BASED FARMING FOR WINDROW MERGER OPERATION

(71) Applicant: Deere & Company, Moline, IL (US)

(72) Inventors: Benjamin M. Lovett, Ottumwa, IA (US); Darin L. Roth, Batavia, IA (US); Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 404 days.

This patent is subject to a terminal disclaimer.

(21) Appl. No.: 18/051,384

(22) Filed: Oct. 31, 2022

(65) Prior Publication Data

US 2024/0142987 A1 May 2, 2024

(51) Int. Cl.

| | |
|---|---|
| ***G05D 1/00*** | (2024.01) |
| ***A01B 63/00*** | (2006.01) |
| ***G05D 1/246*** | (2024.01) |
| ***G05D 1/648*** | (2024.01) |
| ***G05D 105/15*** | (2024.01) |
| ***G05D 107/20*** | (2024.01) |
| ***G05D 109/10*** | (2024.01) |

(52) U.S. Cl.
CPC ......... *G05D 1/0274* (2013.01); *A01B 63/004* (2013.01); *G05D 1/0212* (2013.01)

(58) Field of Classification Search
CPC .. A01B 63/004; G05D 1/0274; G05D 1/0212; G05D 1/246; G05D 1/6484; G05D 2105/15; G05D 2107/21; G05D 2109/10
USPC ........................................................... 701/50
See application file for complete search history.

(56) References Cited

U.S. PATENT DOCUMENTS

| | | | |
|---|---|---|---|
| 9,140,824 | B1 | 9/2015 | Mewes et al. |
| 9,668,418 | B2 | 6/2017 | Patton et al. |
| 10,670,708 | B2 | 6/2020 | Kemmer et al. |

(Continued)

FOREIGN PATENT DOCUMENTS

| | | | |
|---|---|---|---|
| AU | 2013200397 | A1 | 8/2013 |
| CA | 3086545 | A1 | 2/2021 |

(Continued)

OTHER PUBLICATIONS

Extended European Search Report and Written Opinion issued in European Patent Application No. 23203593.1 dated Apr. 29, 2024, in 08 pages.

(Continued)

*Primary Examiner* — Hossam M Abd El Latif
(74) *Attorney, Agent, or Firm* — Christopher J. Volkmann; KELLY, HOLT & CHRISTENSON PLLC

(57) ABSTRACT

One or more information maps are obtained by an agricultural system. The one or more information maps map one or more characteristic values at different geographic locations in a worksite. An in-situ sensor detects a mass flow value as a mobile machine operates at the worksite. A predictive map generator generates a predictive map that maps predictive mass flow values or predictive yield values at different geographic locations in the worksite based on a relationship between the values in the one or more information maps and the mass flow value detected by the in-situ sensor or the yield value based on the detected mass flow value. The predictive map can be output and used in automated machine control.

20 Claims, 14 Drawing Sheets

(56) References Cited

U.S. PATENT DOCUMENTS

| | | | | |
|---|---|---|---|---|
| 10,766,526 | B2 | 9/2020 | Bebernes et al. | |
| 11,096,329 | B2 | 8/2021 | Nichols et al. | |
| 11,160,206 | B2 | 11/2021 | Sloan | |
| 11,589,509 | B2 | 2/2023 | Vandike et al. | |
| 11,592,822 | B2 | 2/2023 | Vandike et al. | |
| 11,653,588 | B2 | 5/2023 | Vandike et al. | |
| 11,672,203 | B2 | 6/2023 | Vandike et al. | |
| 11,849,672 | B2 | 12/2023 | Vandike et al. | |
| 11,930,737 | B2 | 3/2024 | Stephens | |
| 12,013,698 | B2 | 6/2024 | Vandike et al. | |
| 12,035,648 | B2 | 7/2024 | Vandike et al. | |
| 12,075,724 | B2 | 9/2024 | Vandike et al. | |
| 2003/0024228 | A1 | 2/2003 | Franet | |
| 2010/0063681 | A1 | 3/2010 | Correns et al. | |
| 2015/0089912 | A1 | 4/2015 | Patton et al. | |
| 2018/0116115 | A1* | 5/2018 | Rotole | A01D 57/30 |
| 2018/0116125 | A1* | 5/2018 | Gresch | B60K 25/06 |
| 2018/0188366 | A1* | 7/2018 | Kemmer | A01F 15/0825 |
| 2018/0325029 | A1 | 11/2018 | Rotole et al. | |
| 2018/0325032 | A1 | 11/2018 | Rotole et al. | |
| 2018/0346020 | A1 | 12/2018 | Bebernes et al. | |
| 2019/0084764 | A1 | 3/2019 | Dilts et al. | |
| 2020/0205345 | A1* | 7/2020 | Bollinger | A01D 57/26 |
| 2021/0029877 | A1 | 2/2021 | Vandike et al. | |
| 2021/0029878 | A1* | 2/2021 | Vandike | A01D 41/127 |
| 2021/0045283 | A1* | 2/2021 | Faust | A01D 89/006 |
| 2021/0084820 | A1 | 3/2021 | Vandike et al. | |
| 2021/0185914 | A1* | 6/2021 | Stephens | A01D 61/00 |
| 2021/0243936 | A1 | 8/2021 | Vandike et al. | |
| 2021/0243938 | A1 | 8/2021 | Blank et al. | |
| 2021/0243950 | A1 | 8/2021 | Blank et al. | |
| 2021/0243951 | A1* | 8/2021 | Vandike | G05D 1/0274 |
| 2021/0341944 | A1 | 11/2021 | Schoon et al. | |
| 2021/0352836 | A1 | 11/2021 | Roberge et al. | |
| 2021/0360857 | A1 | 11/2021 | Steidinger et al. | |
| 2021/0374881 | A1 | 12/2021 | Wolfson et al. | |
| 2022/0110259 | A1 | 4/2022 | Vandike et al. | |
| 2022/0113729 | A1 | 4/2022 | Vandike et al. | |
| 2022/0207622 | A1* | 6/2022 | Hamilton | G06Q 10/06312 |
| 2022/0210972 | A1 | 7/2022 | Fay, II et al. | |
| 2022/0210974 | A1 | 7/2022 | Fay, II et al. | |
| 2022/0210975 | A1 | 7/2022 | Digman | |
| 2022/0232816 | A1 | 7/2022 | Vandike et al. | |
| 2022/0386533 | A1 | 12/2022 | Hill et al. | |
| 2023/0049727 | A1* | 2/2023 | Hamilton | A01D 43/085 |
| 2023/0345857 | A1 | 11/2023 | McClelland et al. | |
| 2023/0345878 | A1 | 11/2023 | Hamilton et al. | |
| 2023/0376041 | A1* | 11/2023 | Childs | A01F 15/0833 |
| 2024/0032454 | A1 | 2/2024 | Baldwin et al. | |
| 2024/0138284 | A1 | 5/2024 | Lovett et al. | |

FOREIGN PATENT DOCUMENTS

| | | | |
|---|---|---|---|
| CN | 114303598 | A | 4/2022 |
| DE | 102021124715 | A1 | 4/2022 |
| EP | 3315011 | A1 | 5/2018 |
| EP | 3861842 | A1 | 8/2021 |
| EP | 3871481 | A1 | 9/2021 |
| EP | 4023046 | A1 | 7/2022 |
| EP | 3662730 | B1 | 9/2022 |
| WO | WO 2021214580 | A1 | 10/2021 |

OTHER PUBLICATIONS

Extended European Search Report and Written Opinion issued in European Patent Application No. 23203594.9 dated Apr. 29, 2024, in 08 pages.

Extended European Search Report and Written Opinion issued in European Patent Application No. 23203596.4, dated Mar. 26, 2024, in 08 pages.

Extended European Search Report and Written Opinion issued in European Patent Application No. 23203595.6, dated Mar. 15, 2024, in 08 pages.

Barbosa R.N., "Crop Yield Monitors," LSU AgCenter, published Mar. 2012, p. 1-3 (4 Pages).

Non-Final Office Action for U.S. Appl. No. 18/051,335, dated Jan. 16, 2026, 121 pages.

* cited by examiner

MAP BASED FARMING FOR WINDROW MERGER OPERATION

FIELD OF THE DESCRIPTION

The present descriptions relate to mobile machines, particularly mobile agricultural windrowing machine configured to perform a windrowing operation at a field.

BACKGROUND

There are a wide variety of different mobile agricultural machines. Some mobile agricultural machines, such as a self-propelled windrower, cut crop at a field and form windrows out of the cut crop material. Some mobile agricultural machines, such as balers or self-propelled forage harvesters, collect the cut crop from the windrows and further process the cut crop, such as to form bales of crop material or to produce crop silage.

The discussion above is merely provided for general background information and is not intended to be used as an aid in determining the scope of the claimed subject matter.

SUMMARY

One or more information maps are obtained by an agricultural system. The one or more information maps map one or more characteristic values at different geographic locations in a worksite. An in-situ sensor detects a mass flow value as a mobile machine operates at the worksite. A predictive map generator generates a predictive map that maps predictive mass flow values or predictive yield values at different geographic locations in the worksite based on a relationship between the values in the one or more information maps and the mass flow value detected by the in-situ sensor or the yield value based on the detected mass flow value. The predictive map can be output and used in automated machine control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
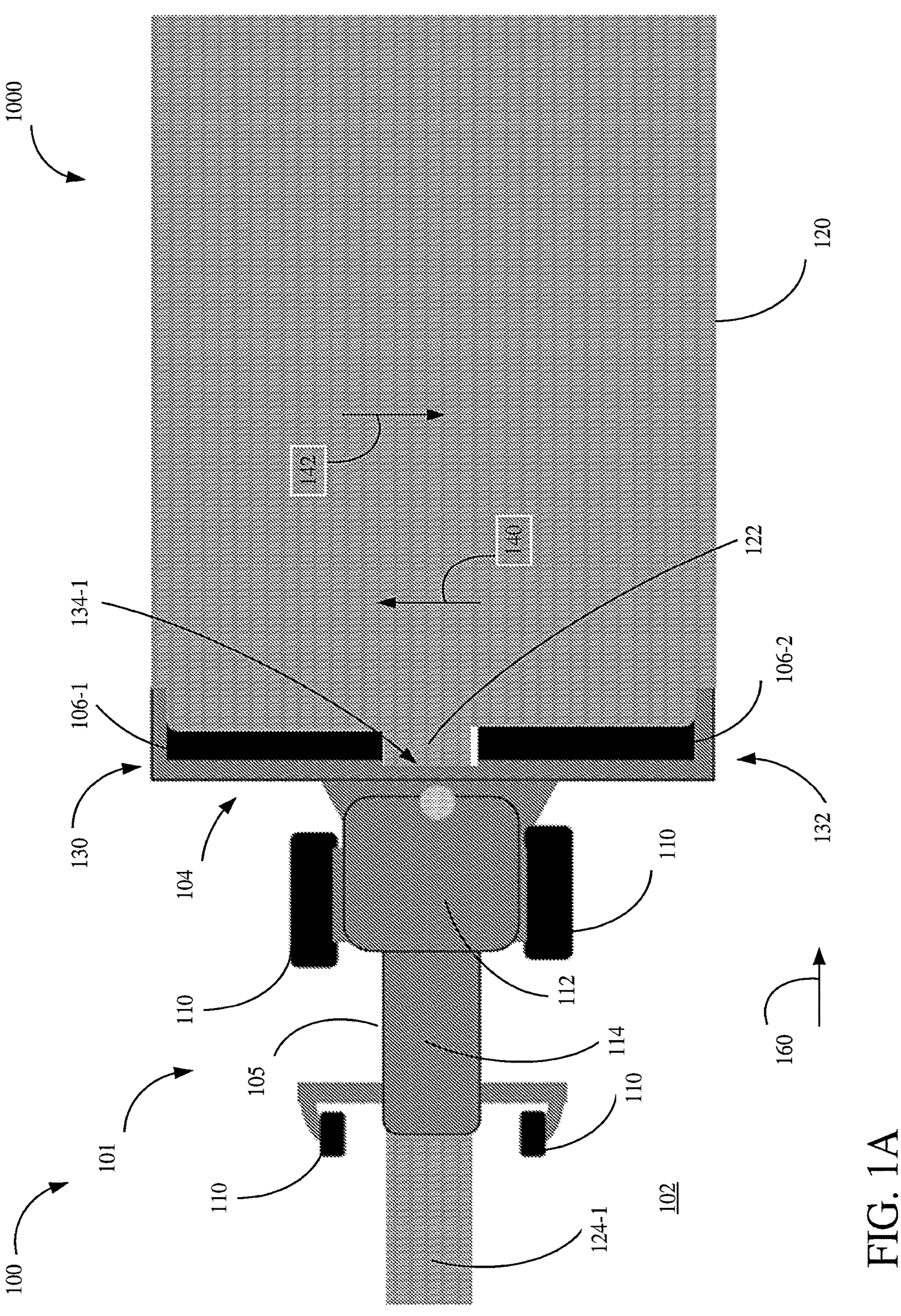
FIGS. 1A, 1B, and 1C illustrate one example of an agricultural environment including one example of a mobile machine as a self-propelled windrow machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some examples, the present description relates to using in-situ data taken concurrently with an operation, such as an agricultural windrowing operation, in combination with prior or predicted data, such as prior or predicted data represented in a map, to generate a predictive model and a predictive map, such as a predictive mass flow or yield model and a predictive mass flow or yield map. In some examples, the predictive map can be used to control a mobile machine, such as a self-propelled windrower, as well as other machines.

As discussed above, mobile agricultural machines, such as mobile windrowing machines, may operate at a field to cut crop and form windrows of the cut crop material. The windrows can be later picked up and processed by various types of follow-on machines, such as forage harvesters, balers, etc. The mass flow of cut crop material being processed by the mobile windrowing machine can be used to derive a resultant yield at various locations throughout the field. It may be desirable to adjust various operating parameters of the mobile windrowing machine based on the mass flow (or yield) and, in some examples, based further on follow-on machine and operation data. Some mobile windrowing machines may be outfitted with sensors, such as mass flow sensors, that detect mass flow values as the windrowing machine operates and can be used in closed-loop, feedback based control. However, such systems are reactive and cannot proactively account for variance of characteristics ahead of the machine. Accordingly, a system is provided herein to provide predictive characteristic values, such as predictive mass flow values or predictive yield values at different geographic locations across the field, including ahead of the windrowing machine relative to its direction of travel or route, such that proactive control of the windrowing machine can be undertaken.

In one example, the present description relates to obtaining an information map such as a topographic map. The topographic map includes geolocated values of topographic characteristics (topographic characteristic values, sometimes referred to herein as topographic values) across different locations at a field of interest. For example, the topographic map can include elevation values indicative of the elevation of the field at various locations, as well as slope values indicative of the slope of the field at various locations. The topographic map, and the values therein, can be based on historical data, such as topographic data detected during previous operations at the worksite by the same mobile machine or by a different mobile machine. The topographic map, and the values therein, can be based on fly-over or satellite-based sensor data, such as lidar data of the worksite, as well as scouting data provided by a user or operator such as from a scouting operation of the worksite. The topographic map can be generated in a variety of other ways.

In one example, the present description relates to obtaining a map such as a vegetative index (VI) map. The VI map includes geolocated VI values across different geographic locations in the field of interest. VI values may be indicative of vegetative growth or vegetation health, or both. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants or plant matter. Without limitations, these bands may be in the microwave, infrared, visible, or ultraviolet portions of the electromagnetic spectrum. A VI map can be used to identify the presence and location of vegetation (e.g., crop, weeds, other plant matter, etc.). The VI map may be generated prior to the current operation or the current operation, such as after the most recent previous operation and prior to the current operation. The VI map can be generated in a variety of other ways.

In one example, the present description relates to obtaining a map such as a crop genotype map (sometimes referred to herein as a genotype map). The crop genotype map illustratively includes geolocated crop genotype values (sometimes referred to herein as genotype values) across different geographic locations in a field of interest. Crop genotype values indicate genotype (e.g., species, hybrid, cultivar, etc.) of crop. The crop genotype map may be generated prior to a current operation, such as based on data collected during a planting operation prior to a current windrowing operation. For example, a planting machine (e.g., row planter, air seeder, drill, etc.) may be outfitted with sensors that generate sensor data indicative of seed placement, seed spacing, seed population, as well as various other characteristics. In other examples, such information may be obtained from a prescriptive map used in the control of the planting machine. The type of seed planted may be provided by an operator or user, or from a seed provider. The placement (e.g., location), spacing, population and type of seed planted can be used to derive crop genotype values across different locations at the field of interest. The crop genotype map can be generated in a variety of other ways.

These are just some examples of the types of information maps that can be obtained by the agricultural system discussed herein. In other examples, various other types of information maps can be obtained.

The present discussion proceeds, in some examples, with respect to systems that obtain one or more (or two or more) maps of a worksite, such as one or more (or two or more) of a topographic map, a vegetative index map, and a crop genotype map, and also use an in-situ sensor to detect a characteristic, such as mass flow. The systems generate a predictive model that models a relationship between the values on the one or more (or two or more) obtained maps and the output values from the in-situ sensor. The predictive model is used to generate a predictive map that predicts, for example, mass flow (or yield) values to different geographic locations in the worksite. The predictive map, generated during an operation, can be presented to an operator or other user or used in automatically controlling a mobile machine during an operation, or both. In some examples, the predictive map can be used to control operating parameters of a mobile machine during an operation.

While the various examples described herein proceed with respect to mobile agricultural machines, such as mobile agricultural windrowing machines, and with respect to agricultural operations, such as agricultural windrowing operations, will be appreciated that the systems and methods described herein are applicable to various other mobile machines and various other machine operations, for example other agricultural machines performing other agricultural operations, forestry machines and forestry operations, construction machines and construction operations, and turf management machines and turf management operations. Additionally, while examples herein proceed with respect to certain example windrowing machines, it will be appreciated that the systems and methods described herein are applicable to various other types of windrowing machines.

As previously mentioned, there are various types of mobile windrowing machines. The description herein proceeds with respect to rotary (or rotary platform) windrowing machines and draper (or draper platform) windrowing machines as examples only.

Figure 1B:
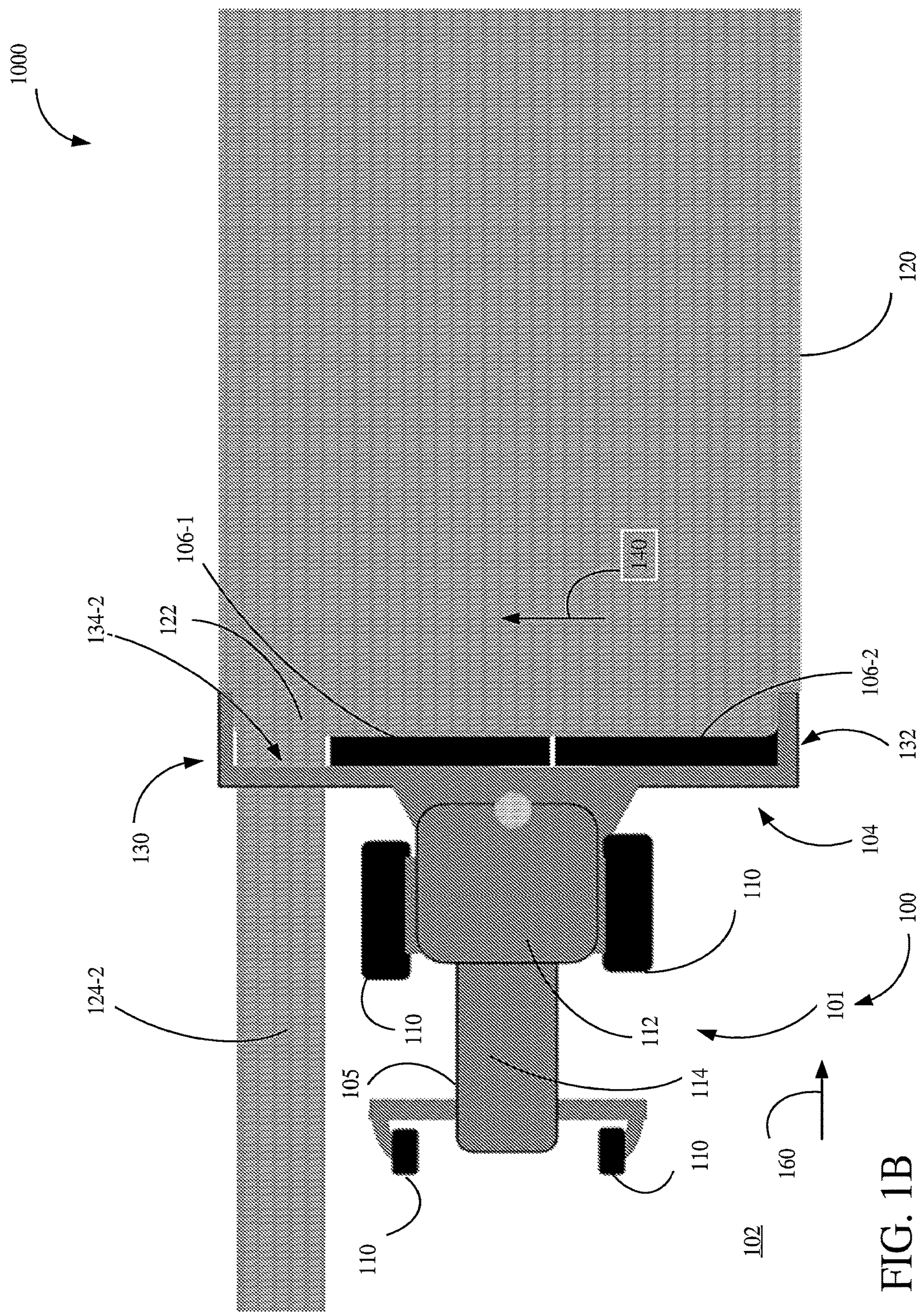
Figure 1C:
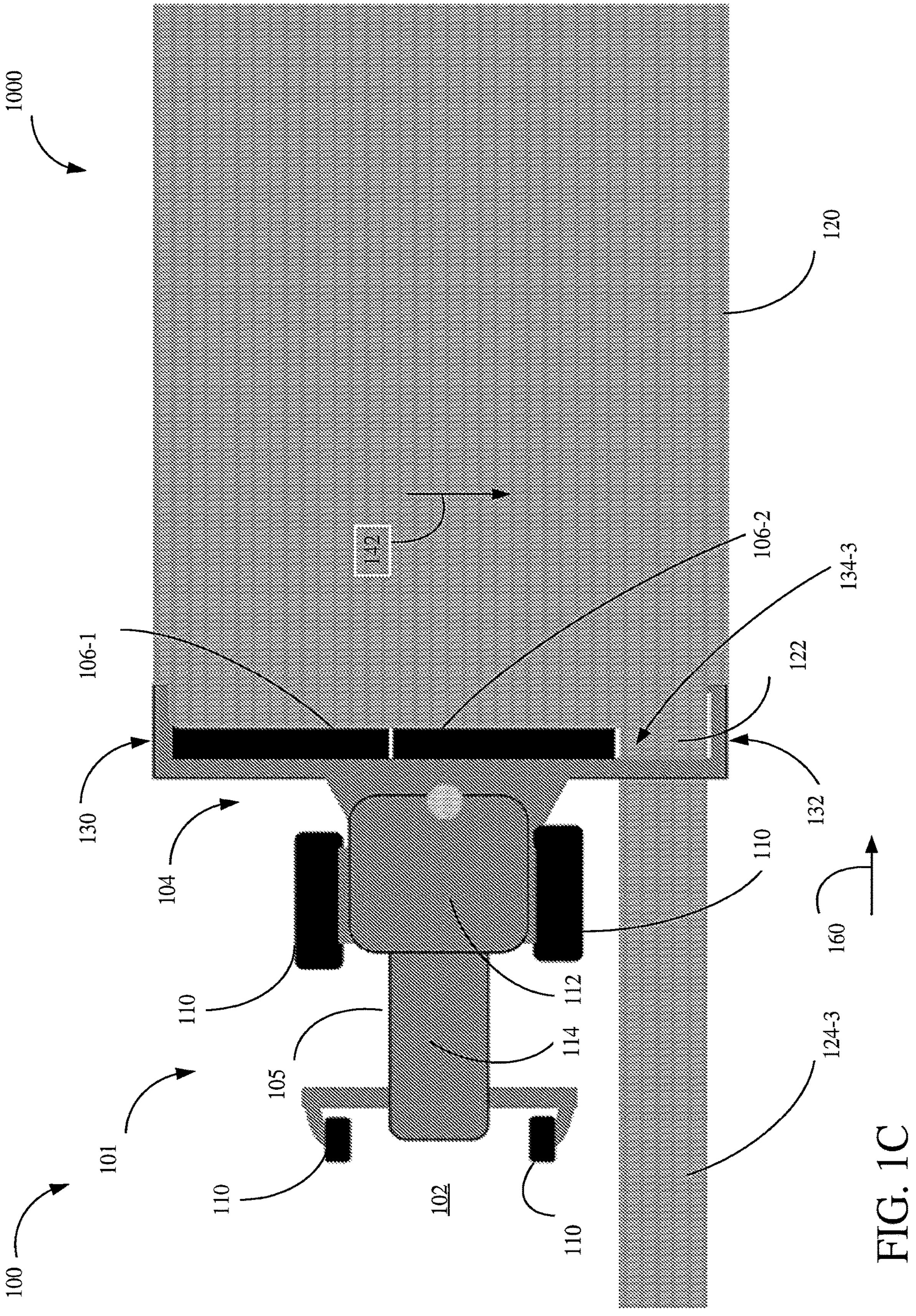

FIG. 1A1C are top views that illustrate an agricultural windrowing environment 1000 that includes a mobile agricultural machine 100 in the form of a mobile draper windrowing machine 101 and a field 102. Draper windrowing machine 101 includes a frame 105 that supports a draper header 104, traction elements 110 (e.g., tires or tracks), operator compartment 112, and a propulsion subsystem compartment 114. Draper windrowing machine 101 can include various other items not shown in FIGS. 1A-1C. For example, draper windrowing machine 101 can include, among other things, various sensors that detect various characteristics (e.g., mass flow) and various actuators that actuate (or drive) various components of machine 101. Header 104 includes belts (e.g., draper belts or merger belts) 106 and can include various other items not shown. For example, header 104 also includes a cutter and a reel which are not shown in FIGS. 1A-1C to better illustrate the operation of belts 106. Those skilled in the art appreciate that the cutter cuts crop 120 (severs the crop stalk) and the reel gathers crop 120 towards cutter and then carries the cut crop 122 further into header 104 such that the cut crop can be merged by belts 106 and formed into a windrow 124.

Figure 5A:
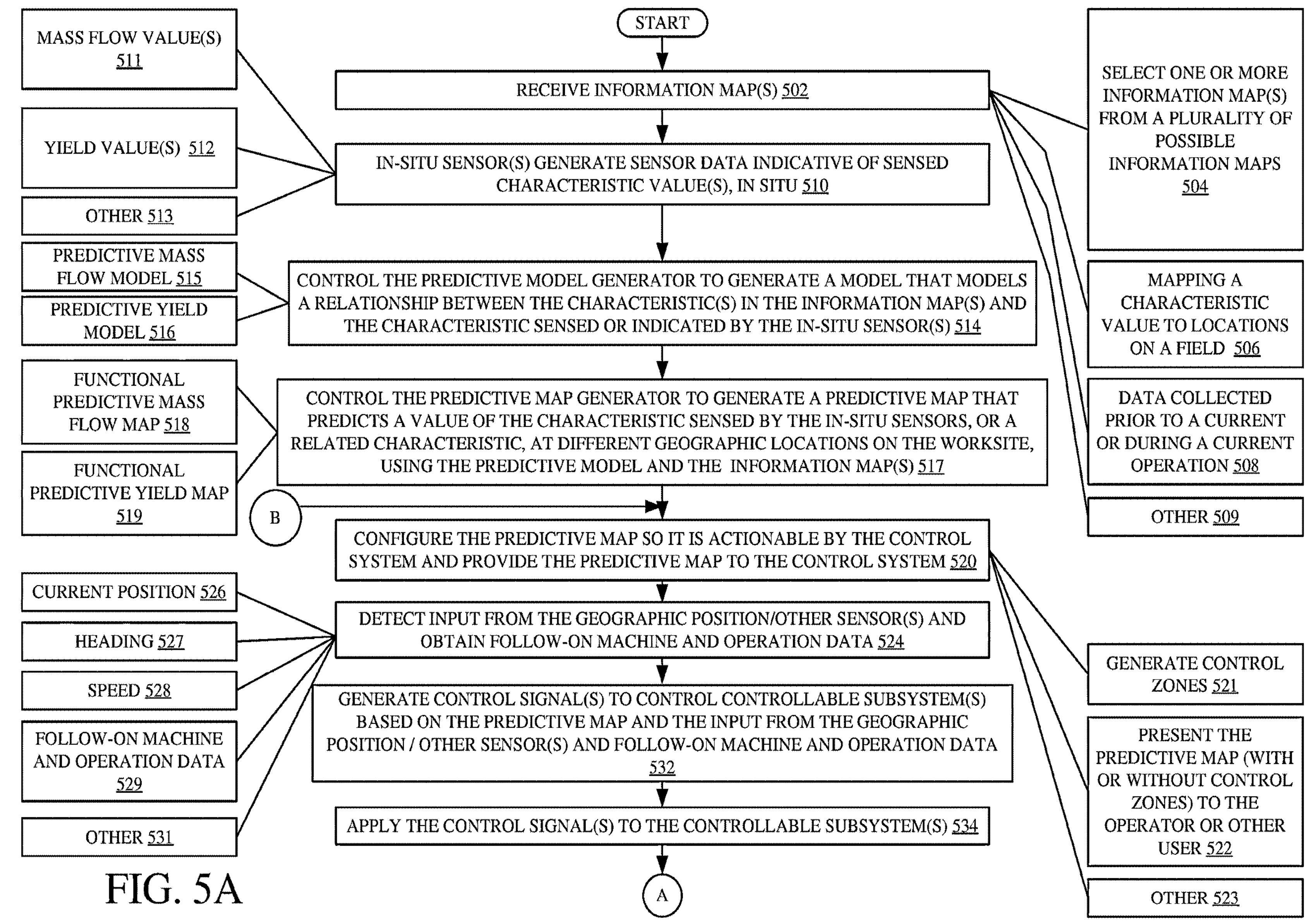
FIGS. 5A-5B (collectively referred to herein as FIG. 5) show a flow diagram illustrating one example of operation of an agricultural windrowing system in generating a map.
Figure 5B:
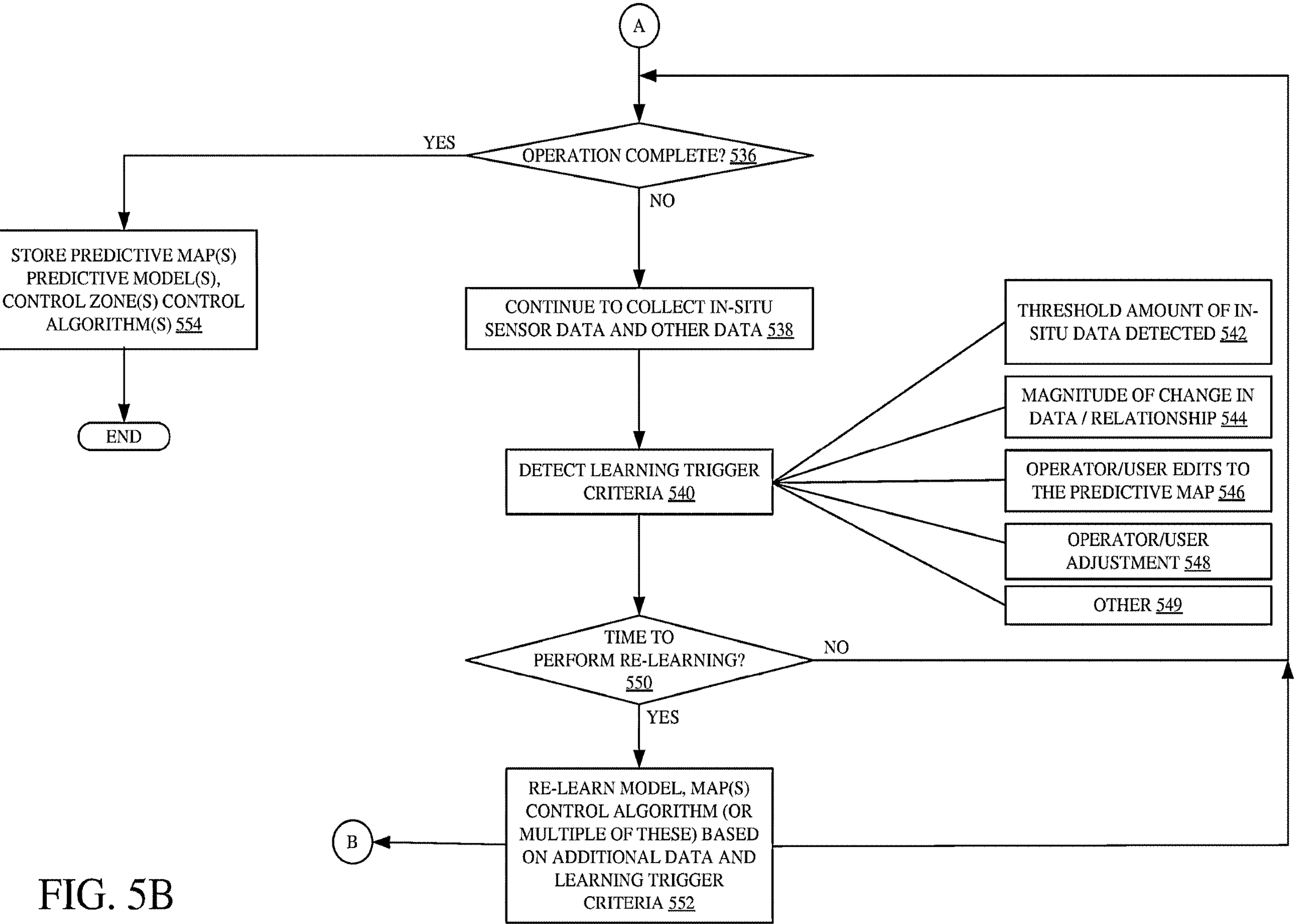

The ground engaging traction elements 110 are illustratively shown as wheels with tires, but can also be tracks, or other traction elements as well. Propulsion subsystem compartment 114 illustratively houses one or more elements of a propulsion subsystem (e.g., powertrain), such as a powerplant (e.g., internal combustion engine, etc.). The propulsion subsystem drives traction elements 110 to propel machine 101 across field 102. In the example illustrated, machine 101 includes an operator compartment or cab 112, which can include a variety of different operator interface mechanisms (e.g., 318 shown in FIG. 5) for controlling machine 101. In some examples, machine 101 may be autonomous and thus an operator need not be in cab 112 or cab 112 may not be included on machine 101.

FIGS. 1A-1C illustrate that windrowing machine 101 includes two merger belts 106-1 and 106-2 that controllably actuated to rotate in two directions (indicated by arrows 140 and 142), transverse to the direction of travel of windrowing machine 101 (indicated by arrow 160) to merge cut crop 122 and propel the cut crop 122 through an opening (134-1, 134-2, 134-3) into a windrow 124. As illustrated, the belts 106 are also controllably positionable to define which opening 134 the cut crop 122 is propelled through.

As shown in FIG. 1A, the belt 106-1 is positioned at a first end 130 (illustratively a left end) of header 104 and belt 106-2 is positioned at a second end 132 (illustratively a right end) of header 104 such that cut crop 122 is provided through middle opening 134-1 to form windrow 124-1. Windrow 124-1 is often formed when merger with other windrows is not desired. As illustrated in FIG. 1A, belt 106-1 is controlled to rotate in the direction indicated by arrow 142 and belt 106-2 is controlled to rotate in the direction indicated by arrow 140.

As shown in FIGS. 1B-1C, the belts 106 are controlled such that the cut crop is provided through an opening 134 at or near an end of header 104.

In FIG. 1B, belt 106-1 has been positioned away from end 130 and both belts 106-1 and 106-2, in FIG. 1B, are controlled to rotate in the direction indicated by arrow 140 to propel the cut crop 122 through first end opening (left end opening) 134-2 to form windrow 124-2.

In FIG. 1C, belt 106-1 has been positioned at or near end 130 and belt 106-2 has been positioned away from end 132. Both belts 106-1 and 106-2, in FIG. 1C, are controlled to rotate in the direction indicated by arrow 142 to propel the cut crop 122 through second end opening (right end opening) 134-3 to form windrow 124-3.

Windrows 124-2 and 124-3 are often selectively formed when it is desirable to merge multiple windrows (e.g., merge the windrow from the current pass with windrow(s) from previous pass(es) or with windrow(s) in future pass(es)).

Figure 2A:
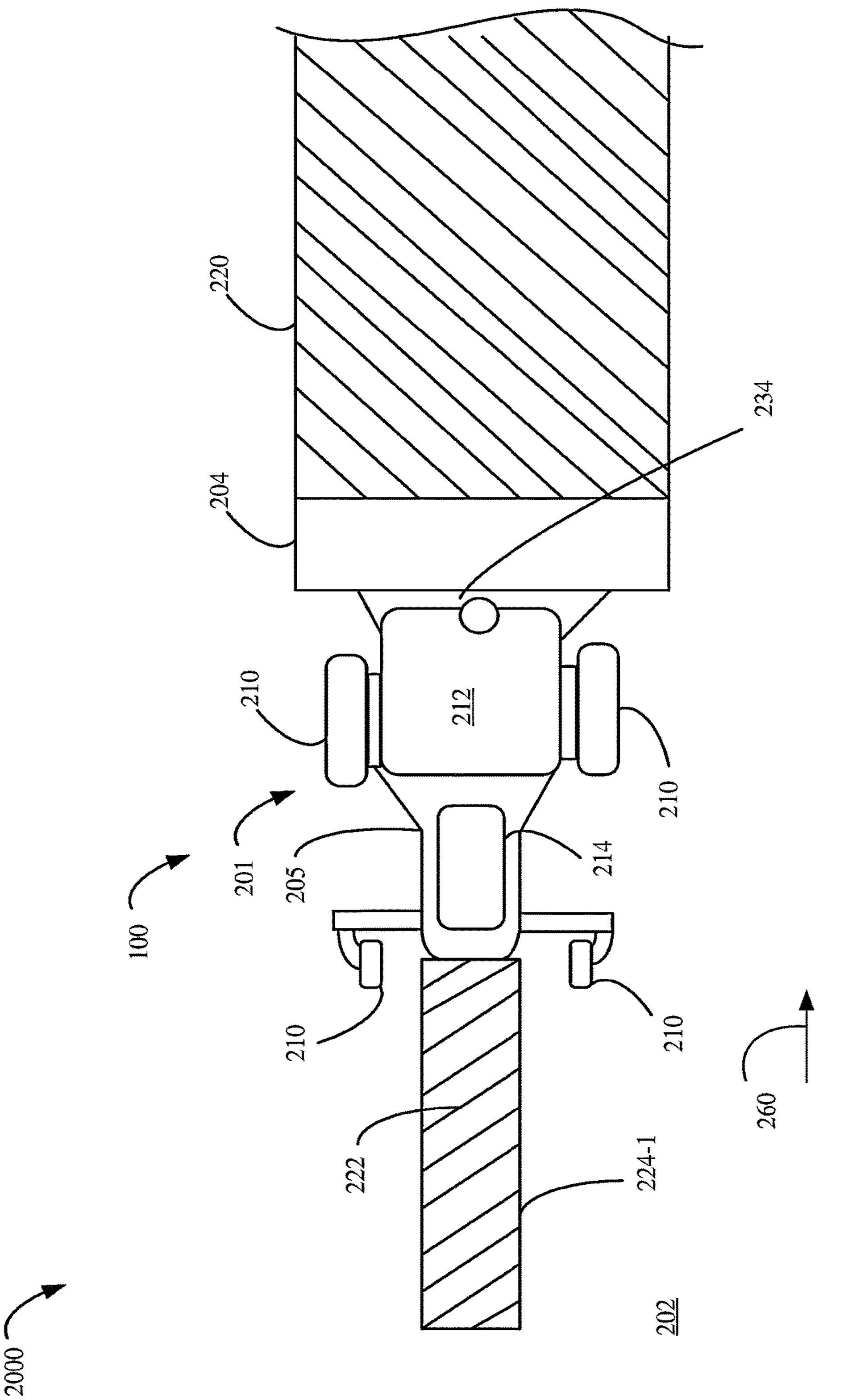
FIGS. 2A-2B illustrates one example of an agricultural environment including one example of a mobile machine as a self-propelled windrow machine.
Figure 2B:
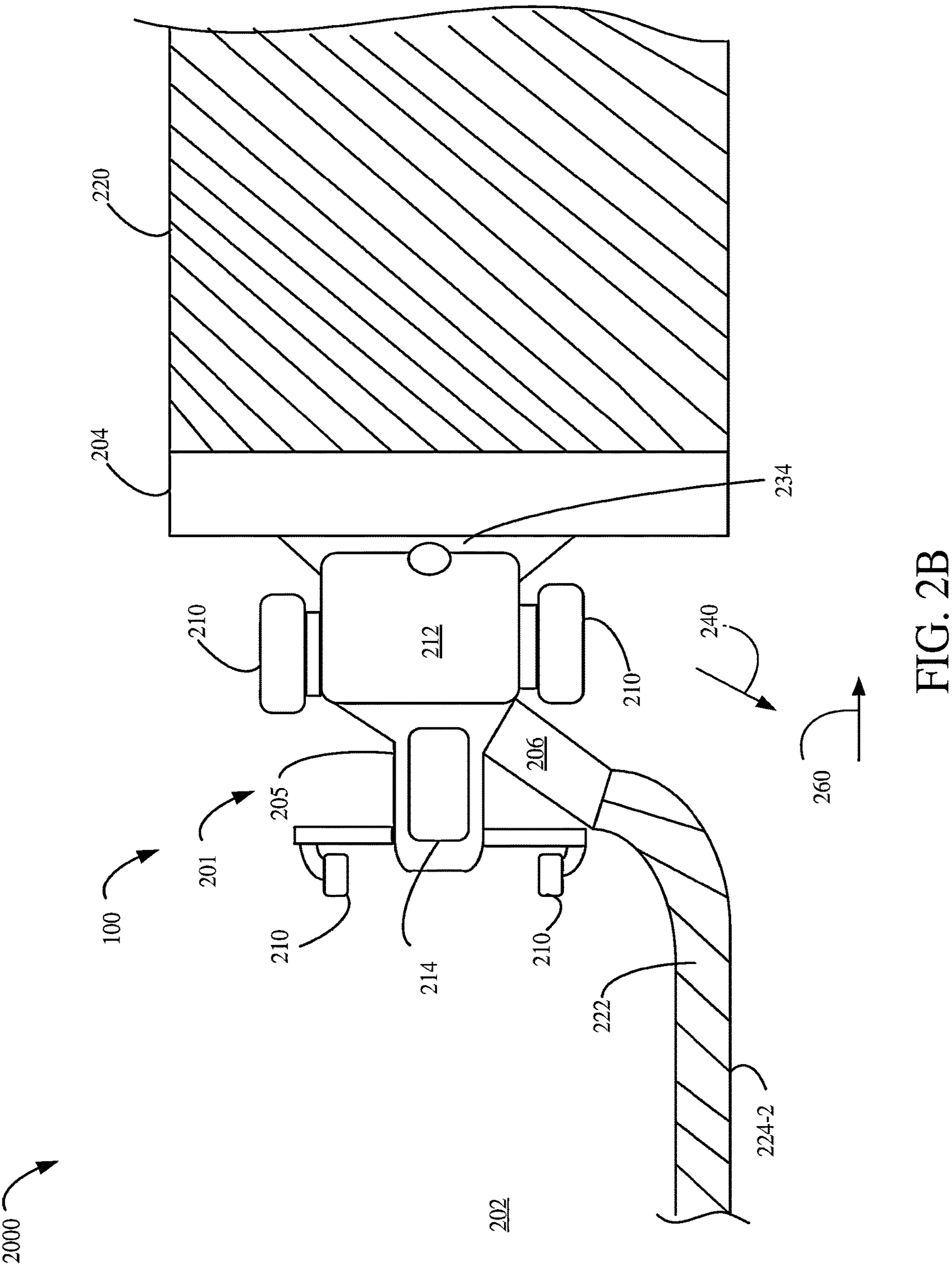

FIGS. 2A-2B are top views that illustrate an agricultural windrowing environment 2000 that includes a mobile agricultural machine 100 in the form of a mobile rotary windrowing machine 201 and a field 202. Rotary windrowing machine 201 includes a frame 205 that supports a rotary header 204, belt 206 (e.g., merger belt), traction elements 210 (e.g., tires or tracks), operator compartment 212, and a propulsion subsystem compartment 214. Rotary windrowing machine 201 can include various other items not shown in FIGS. 2A-2B. For example, rotary windrowing machine 201 can include, among other things, various sensors that detect various characteristics (e.g., mass flow) and various actuators that actuate (or drive) various components of machine 201. Header 204 includes various items which are not shown in FIGS. 2A-2B for the purpose of better illustrating the merging operation of machine 201.

The ground engaging traction elements 210 are illustratively shown as wheels with tires, but can also be tracks, or other traction elements as well. Propulsion subsystem compartment 214 illustratively houses one or more elements of a propulsion subsystem (e.g., powertrain), such as a powerplant (e.g., internal combustion engine, etc.). The propulsion subsystem drives traction elements 210 to propel machine 201 across field 202 in a direction of travel 260. In the example illustrated, machine 201 includes an operator compartment or cab 212, which can include a variety of different operator interface mechanisms (e.g., 318 shown in FIG. 5) for controlling machine 201. In some examples, machine 201 may be autonomous and thus an operator need not be in cab 212 or cab 212 may not be included on machine 201.

As shown in FIG. 2A, merger belt 206 is not deployed (e.g., is in a storage position) and thus, machine 201 cuts crop 220, propels the cut crop 222 through housing 234 (which has a passageway therethrough) and forms windrow (middle windrow) 224-1. Windrow 224-1 is often formed when merger with other windrows is not desired or when a triple windrow (three merged windrows) is to be formed as opposed to a double windrow (two merged windows).

As shown in FIG. 2B, merger belt 206 has been deployed (e.g., is angled downward in an operating position) and thus, machine 201 cuts crop 220, propels the cut crop 222 through housing 234. Merger belt 206 is controllably actuated (e.g., rotated) to transport the cut crop 222 in a direction transverse (as indicated by arrow 240) to the direction of travel (as indicated by arrow 260) to form windrow 224-2. Windrow 224-2 is often selectively formed when it is desirable to merge multiple windrows (e.g., merge the windrow from the current pass with windrow(s) from previous pass(es) or with windrow(s) in future pass(es)).

Figure 3:
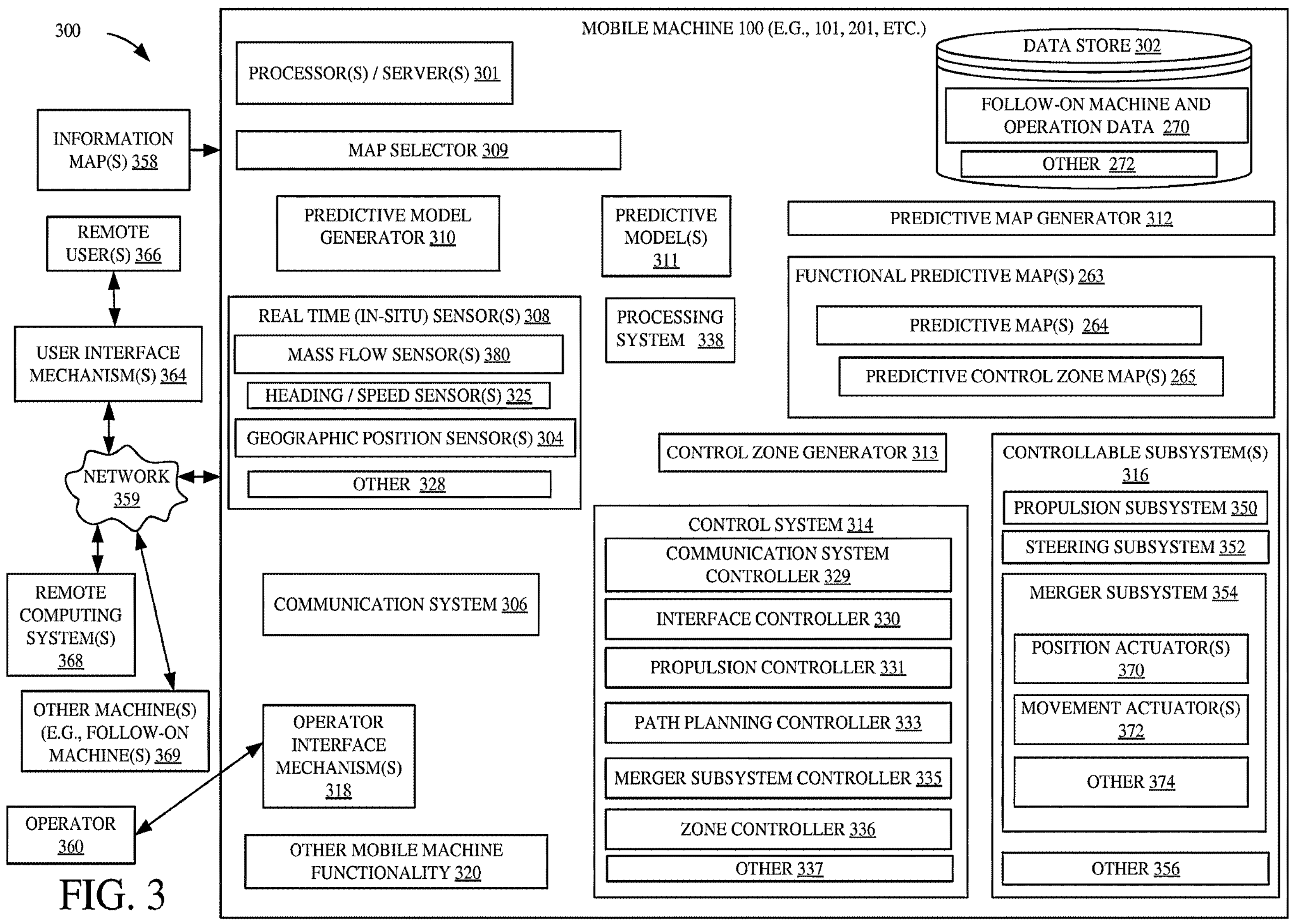
FIG. 3 is a block diagram showing some portions of an agricultural windrowing system, including a mobile windrowing machine, in more detail, according to some examples of the present disclosure.

FIG. 3 is a block diagram showing some portions of an agricultural windrowing system architecture 300 (also referred to herein as agricultural system 300 or agricultural windrowing system 300). FIG. 3 shows that agricultural windrowing system architecture 300 includes mobile machine 100 (e.g., draper windrowing machine 101, rotary windrowing machine 201, etc.), one or more remote computing systems 368, one or more remote user interfaces 364, one or more other machines 369 (e.g., one or more follow-on machines) and network 359. Mobile machine 100, itself, illustratively includes one or more processors or servers 301, data store 302, communication system 306, one or more in-situ sensors 308 that sense one or more characteristics at a worksite (e.g., field 102, 202, etc.) concurrent with an operation, and a processing system 338 that processes the sensor data (e.g., signals, images, etc.) generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine 100 can also include a wide variety of other machine functionality 320.

Data store 302 includes follow-on machine and operation data 270 and can include various other data 272 including various data generated by other items of system 300 as well as computer executable instructions that are executable by the one or more processors or servers 301 to provide various functionality described herein. Other data 272 can also include data about machine 100, such as model, type, dimensions, etc. (e.g., cut (or header width) data 399). Follow-on machine and operation data 270 includes data indicative of the type and model of a follow-on machine (e.g., a baler, self-propelled forage harvester, etc.), they type of operation to be performed (e.g., baling, producing silage, etc.), the dimensions, capabilities, and capacities of the follow-on machine, preferences of the operator of the follow-on machine, prescriptions for the follow-on machine, as well as various other information. The follow-on machine and operation data 270 can be used by control system 314, along with other data (e.g., a functional predictive map 263), to control one or more controllable subsystems 316. The follow-on machine and operation data 270 can be provided by a user 366, an operator 360, or by a follow-on machine 369, or a combination thereof.

The in-situ sensors 308 can be on-board mobile machine 100, remote from mobile machine 100, such as deployed at fixed locations on the worksite or on another machine operating in concert with mobile machine 100, such as an aerial vehicle, and other types of sensors, or a combination thereof. In-situ sensors 308 sense characteristics at a worksite during the course of an operation. In-situ sensors 308 illustratively include one or more mass flow sensors 380, one or more heading/speed sensors 325, one or more geographic position sensors 304, and can include various other sensors 328.

Mass flow sensors 380 detect a mass flow of material (e.g., cut crop) through mobile machine 100 and generate sensor data indicative of mass flow values. Mass flow sensors 380 can include sensors that detect a force (e.g., hydraulic pressure, pneumatic pressure, current, etc.) that is used to drive a component of the mobile machine 100 at a set speed. For example, the amount of force needed to rotate a merger belt (106, 206), or, in the case of draper windrowing machine 101, the force used to rotate the reel of header 104, or, in the case of rotary windrowing machine 201, the force used to rotate the conditioning rollers. In other examples, the cut crop may engage and impart a force (e.g., a load) on a component (e.g., swath flap(s) of header 204) which may be detected by one or more mass flow sensors 380. Thus, mass flow sensors 380 may include various types of force sensors, such as pressure sensors (e.g., hydraulic pressure sensors, air pressure sensors, etc.), current or voltage sensors, load cells, strain gauges, as well as a variety of other type of sensors.

Geographic position sensors 304 illustratively sense or detect the geographic position or location of mobile machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors.

Heading/speed sensors 325 detect a heading and speed at which mobile machine 100 is traversing the worksite during the operation. This can include sensors that sense the movement of ground engaging traction elements (110 or 210) or can utilize signals received from other sources, such as geographic position sensor 304. Thus, while heading/speed sensors 325 as described herein are shown as separate from geographic position sensor 304, in some examples, machine heading/speed is derived from signals received from geographic positions sensors 304 and subsequent processing. In other examples, heading/speed sensors 325 are separate sensors and do not utilize signals received from other sources.

Other in-situ sensors 328 may be any of a variety of other types of sensors. Other in-situ sensors 328 can be on-board mobile machine 100 or can be remote from mobile machine 100, such as other in-situ sensors 328 on-board another mobile machine that capture in-situ data of the worksite or sensors at fixed locations throughout the worksite. The remote data from remote sensors can be obtained by mobile machine 100 via communication system 306 over network 359.

In-situ data includes data taken from a sensor on-board the mobile machine 100 or taken by any sensor where the data are detected during the operation of mobile machine 100 at a field.

Processing system 338 processes the sensor data generated by in-situ sensors 308 to generate processed sensor data indicative of the sensed variables. For example, processing system generates processed sensor data indicative of sensed variable values based on the sensor data generated by in-situ sensors 308, such as mass flow values based on sensors data generated by mass flow sensors 380, geographic location values based on sensor data generated by geographic position sensors 304, machine speed (travel speed, acceleration, deceleration, etc.) values or heading values, or both, based on sensor data generated by heading/speed sensors 325, as well as various other values based on sensors signals generated by various other in-situ sensors 328. Additionally, processing system 338 may derive yield values based on the sensor data generated by mass flow sensors 380 and sensor data generated by heading/speed sensors 325. For example, yield values can be derived from mass flow values, travel speed values, and cut (or header) width values (e.g., a width of the header of machine 100).

It will be understood that processing system 338 can be implemented by one or more processers or servers, such as processors or servers 301. Additionally, processing system 338 can utilize various sensor data processing functionalities such as noise filtering functionalities, sensor data categorization, aggregation, normalization, as well as various other sensor data processing functionalities. Similarly, processing system 338 can utilize various image processing techniques such as, sequential image comparison, RGB color extraction, edge detection, black/white analysis, machine learning, neural networks, pixel testing, pixel clustering, shape detection, as well any number of other suitable image processing and data extraction functionalities.

FIG. 3 shows that an operator 360 may operate mobile machine 100. The operator 360 interacts with operator interface mechanisms 318. The operator 360 may be local to mobile machine 100 or may be remote from mobile machine 100. In some examples, operator interface mechanisms 318 may include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, operator 360 may interact with operator interface mechanisms 318 using touch gestures. These examples described above are provided as illustrative examples and are not intended to limit the scope of the present disclosure. Consequently, other types of operator interface mechanisms 318 may be used and are within the scope of the present disclosure.

FIG. 3 also shows one or more remote users 366 interacting with mobile machine 100 or remote computing systems 368, or both, through user interface mechanisms 364 over network 359. User interface mechanisms 364 can include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, a remote user 364 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems 368 or by remote users 366, or both. As will be described below, in some examples, one or more of the components shown being disposed on mobile machine 100 in FIG. 3 can be located elsewhere, such as at remote computing systems 368 and/or user interface mechanisms 364.

FIG. 3 also shows that mobile machine 100 can obtain one or more (or two or more) information maps 358. As described herein, the information maps 358 include, for example, a topographic map, a vegetative index (VI) map, and a crop genotype map. However, information maps 358 may also encompass other types of data, such as other types of data that were obtained prior to the current operation or a map from a prior operation. In other examples, information maps 358 can be generated during a current operation, such a map generated by predictive map generator 312 based on a predictive model 311 generated by predictive model generator 310.

Information maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

Predictive model generator 310 generates a model that is indicative of a relationship between the values sensed by (or the values derived from the values sensed by) the in-situ sensors 308 and one or more (or two or more) values mapped to the field by the information maps 358. For example, if the one or more (or two or more) information maps 358 map one or more (or two or more) of topographic characteristic values, vegetative index values, and crop genotype values to different locations in the worksite, and the in-situ sensor 308 (e.g., 380) is sensing a value indicative of mass flow, then model generator 310 generates a predictive mass flow model that models the relationship between the mapped values (one or more (or two or more) of the topographic characteristic values, vegetative index values, and crop genotype values) and the mass flow values. If processing system 338 further derives yield values from the mass flow sensor data generated by the in-situ sensor 308 (e.g., 380), then model generator 310 generates a predictive yield model that models the relationship between the mapped values (one or more (or two or more) of the topographic characteristic values, vegetative index values, and crop genotype values) and the yield values.

In some examples, the predictive map generator 312 uses the predictive models generated by predictive model generator 310 to generate one or more functional predictive maps 263 that predict the value of a characteristic, such as mass flow values or yield, sensed by the in-situ sensors 308 or derived from sensor data generated by the in-situ sensors 308, at different locations in the worksite based upon one or more (or two or more) of the information maps 358. For example, where the predictive model is a predictive mass flow model that models a relationship between mass flow sensed by mass flow sensors 380 and one or more (or two or more) of topographic characteristic values, vegetative index values, and crop genotype values then predictive map generator 312 generates a functional predictive mass flow map that predicts mass flow values at different locations at the field based on one or more (or two or more) of the topographic characteristic values, vegetative index values, and crop genotype values at those locations and the predictive mass flow model. In another example, where the predictive model is a predictive yield model that models a relationship between yield values derived from sensor data generated by mass flow sensors 380 and one or more (or two or more) of topographic characteristic values, vegetative index values, and crop genotype values then predictive map generator 312 generates a functional predictive yield map that predicts yield values at different locations at the field based on one or more (or two or more) of the topographic characteristic values, vegetative index values, and crop genotype values at those locations and the predictive yield model.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As an example, but not by limitation, the information map 358 can be a topographic map and the in-situ sensor 308 is a mass flow sensor 380 that senses a value indicative of mass flow, predictive map generator 312 can use the topographic characteristic values in information map 358, and the predictive model generated by predictive model generator 310, to generate a functional predictive map 263 that predicts mass flow at different locations in the field based on the topographic characteristic values in the topographic map at those different locations and based on the predictive model. Predictive map generator 212 thus outputs predictive map 264.

As shown in FIG. 3, predictive map 264 predicts the value of a characteristic sensed by in-situ sensors 308 (e.g., mass flow), or a characteristic related to the sensed characteristic (e.g., yield), at various locations across the worksite based upon one or more (or two or more) information values in one or more (or two or more) information maps 358 at those locations and using the predictive model. For example, but not by limitation, if predictive model generator 310 has generated a predictive model indicative of a relationship between vegetative index values and mass flow values (or yield values), then, given the vegetative index value at different locations across the worksite, predictive map generator 312 generates a predictive map 264 that predicts mass flow values (or yield values) at those different locations across the worksite. The vegetative index value, obtained from the vegetative index map, at those locations and the relationship between vegetative index values and mass flow values (or yield values0, obtained from the predictive model, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308 or the data type derived from the sensor data, yet the data type in the predictive map 264 is the same as the data type sensed by the in-situ sensors 308 or the data type derived from the sensors data. For instance, the information map 358 may be a vegetative index map, and the variable sensed by the in-situ sensors 308 may be mass flow. The predictive map 264 may then be a predictive mass flow map that maps predicted mass flow values to different geographic locations in the in the field. In another instance, the information map 358 may be a vegetative index map, and the variable derived from the sensor data may be yield. The predictive map 264 may then be a predictive yield map that maps predicted yield values to different geographic locations in the field.

Also, in other examples, the data type in the information map 358 is different from the data type sensed by in-situ sensors 308, and the data type in the predictive map 264 is different from both the data type in the information map 358 and the data type sensed by the in-situ sensors 308. For instance, the information map 358 may be a vegetative index map, a crop genotype map, or a topographic map, the sensors 308 may sense mass flow, and the predictive map 264 may predict yield.

In other examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a prior windrowing map generated during a previous windrowing operation on the worksite, and the variable sensed by the in-situ sensors 308 may be mass flow. The predictive map 264 may then be a predictive mass flow map that maps predicted mass flow values to different geographic locations in the field.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a prior operation map generated during a previous year or during a previous cutting operation during the same year that maps mass flow (or yield) in the operation during the previous year or in the previous operation during the same year, and the variable of interest may be mass flow sensed by the in-situ sensors 308 or may be yield derived from data generated by the in-situ sensors 308. The predictive map 264 may then be a predictive mass flow map that maps predicted mass flow values to different geographic locations in the field or a predictive yield map that maps predicted yield values to different geographic locations in the field. In such an example, the relative differences in the georeferenced information map 358 from the prior year or from the same year can be used by predictive model generator 310 to generate a predictive model that models a relationship between the relative differences on the information map 358 and the values sensed by in-situ sensors 308 or derived from in-situ sensors 308 during the current operation. The predictive model is then used by predictive map generator 310 to generate a predictive mass flow map.

In another example, the information map 358 may be a map generated during a prior operation in the same year, such as a crop genotype generated during a planting operation earlier in the year, and the variable sensed by the in-situ sensors 308 during the current operation may be mass flow. The predictive map 264 may then be a predictive mass flow map that maps predicted mass flow values to different geographic locations in the worksite. In such an example, crop genotype values at time of the prior planting operation in the same year (or from a previous year such as where the crop is a perennial crop) are geo-referenced recorded and provided to mobile machine 100 as an information map 358. In-situ sensors 308 during a current operation can detect mass flow at geographic locations in the field and predictive model generator 310 may then build a predictive model that models a relationship between mass flow at the time of the current operation and crop genotype values at the time of the prior planting operation in the same year. This is merely an example. In a similar example, the variable of interest may be yield, derived from mass flow data generated by mass flow sensors 380, during the current operation. The predictive map may then be a predictive yield map that maps predicted yield values to different geographic locations in the worksite. In such an example, crop genotype values at the time of the prior planting operation in the same year are geo-referenced recorded and provided to mobile machine 100 as an information map 358. Yield values during a current operation corresponding to geographic locations in the field can be derived from sensor data generated by in-situ sensors 308 and predictive model generator 310 may then build a predictive model that models a relationship between yield at time of the current operation and crop genotype values at the time of the prior planting operation in the same year. This is merely an example.

In some examples, predictive map 264 can be provided to the control zone generator 313. Control zone generator 313 groups adjacent portions of an area into one or more control zones based on data values of predictive map 264 that are associated with those adjacent portions. For example, adjacent data values of predictive map 264 that are similar (e.g., the same or in a same range) can be grouped into a control zone. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crop genotypes (e.g., species, hybrids, cultivars, etc.) may be simultaneously present in the field. In that case, predictive map generator 312 and control zone generator 313 are able to identify the location and characteristics of the two or more crop genotypes and then generate predictive map 264 and predictive map with control zones 265 accordingly.

It will also be appreciated that control zone generator 313 can cluster values of the predictive map 264 to generate control zones and the control zones can be added to predictive control zone map 265, or a separate map, showing only the control zones that are generated. For example, control zone generator 313 may generate control zones by clustering data values of the predictive map 264 that are within the same range. In some examples, the control zones may be used for controlling or calibrating mobile machine 100 or both. In other examples, the control zones may be presented to the operator 360 or a user 366, or both, and used to control or calibrate mobile machine 100, and, in other examples, the control zones may be presented to the operator 360 or another user, such as a remote user 366, or stored for later use.

FIG. 3 also shows that mobile machine 100 includes a control system 314 and one or more controllable subsystems 316. The control system 314 and the controllable subsystems 316 may vary based on the type of mobile machine 100 that is being operated. Predictive map 264 or predictive control zone map 265, or both, are provided to control system 314, which generates control signals based upon the predictive map 264 or predictive control zone map 265 or both, as well, in some examples, based on various other data.

Control system 314 includes communication system controller 329, interface controller 330, propulsion controller 331, path planning controller 333, merger subsystem controller 335, zone controller 336, and can include various other items 337 including various other controllers. As shown in FIG. 3, controllable subsystems 316 include propulsion subsystem 350, steering subsystem 352, merger subsystem 354, and can include various other items including various other controllable subsystems 356.

Merger subsystem 354, itself, includes one or more position actuators 370, one or more movement actuators 372, and can include various other items 374, such as various other actuators.

Position actuators 370 can be various types of actuators such as hydraulic actuators, pneumatic actuators, electromechanical actuators, etc. Position actuators 370 are controllable to adjust a position of one or more merger belts of mobile machine 100. For example, in the case of draper windrowing machine 101, position actuators 370 are operable to adjust the position of merger belts 106, such as to define which opening 234 the cut crop passes through. In the case of rotary windrowing machine 201, position actuators 370 are operable to adjust the position (e.g., angle) of merger belt 206, such as to move the merger belt 206 between a storage and deployed position.

Movement actuators 372 can be various type of actuators such as hydraulic motors, pneumatic motors, electric motors, etc. Movement actuators 372 are controllable to adjust one or more of the direction in which and the speed at which the merger belt(s) move. For example, in the case of draper windrowing machine 101, movement actuators 372 are operable to adjust both the direction of rotation and the speed of rotation of merger belts 106. In the case of rotary windrowing machine 201, movement actuators 372 are operable to adjust the speed of rotation of merger belt 206.

Merger subsystem controller 335 generates control signals to control merger subsystem 354. For example, merger subsystem controller 335 can generate control signals to control merger subsystem 354 based on a predictive map 264 or a predictive control zone map 265 as well as follow-on machine and operation data 270 and various other inputs. For example, map 264 or map 265, or both, may show predictive mass flow values or predictive yield values at different geographic locations at the field, including at locations ahead of mobile machine 100 relative to the route or heading of mobile machine 100. Based on the predictive values (e.g., predictive mass flow values or predictive yield values), merger subsystem controller 335 can generate control signals to control merger subsystem 354. In addition to the predictive values provided by the map 264 or the map 265, merger subsystem controller 335 can consider follow-on machine and operation data 270 to determine if and how windrows should be merged and generate control signals to control merger subsystem 335 accordingly.

In some examples, communication system controller 329 controls communication system 306 to communicate the predictive map 264 or predictive control zone map 265 or control signals based on the predictive map 264 or predictive control zone map 265 to other mobile machines that are operating at the same worksite or in the same operation. For example, communication system controller 329 can control communication system 306 to communicate the predictive map 264 or predictive control zone map 265, or both, to other machines 369, such as one or more follow-on machines which may use the predictive map 264 or the predictive control zone map 265 which in turn may be used by the other machines 369 (e.g., one or more follow-on machines) for control. In some examples, communication system controller 329 controls the communication system 306 to send the predictive map 264, predictive control zone map 265, or both to other remote systems, such as remote computing systems 368.

Interface controller 330 is operable to generate control signals to control interface mechanisms, such as operator interface mechanisms 318 or user interface mechanisms 364, or both. The interface controller 330 is also operable to present the predictive map 264 or predictive control zone map 265, or both, or other information derived from or based on the predictive map 264, predictive control zone map 265, or both, to operator 360 or a remote user 366, or both. As an example, interface controller 330 generates control signals to control a display mechanism (e.g., of 318 or 364 or both) to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation or desire.

Propulsion controller 331 illustratively generates control signals to control propulsion subsystem 350 to control a speed setting, such as one or more of travel speed, acceleration, deceleration, and propulsion direction (e.g., forward and reverse), based on one or more of the predictive map 264, the predictive control zone map 265, and the predictive model 311. The propulsion subsystem 350 includes various powertrain elements, such as a motor or engine, a gear box (e.g., transmission), components of hydrostatic drive(s) (such as a hydrostatic transmission, fluid pumps, fluid motors, etc.), as well as various actuators.

Path planning controller 333 illustratively generates control signals to control steering subsystem 352 to steer mobile machine 100 according to a desired path or according to desired parameters, such as desired steering angles based on one or more of the predictive map 264, the predictive control zone map 265, and follow-on machine and operation data 270. Path planning controller 333 can control a path planning system to generate a route for mobile machine 100 and can control propulsion subsystem 350 and steering subsystem 352 to steer agricultural mobile machine 100 along that route. Steering subsystem 352 includes one or more actuators to control the heading of mobile machine 100, such as by adjusting a steering angle of one or more ground engaging traction elements (e.g., 110, 210, etc.) of mobile machine 100 (in the case of Ackermann steering), or by adjusting a speed (e.g., rotational velocity) of one ground engaging traction element relative to another ground engaging traction element (e.g., in the case of differential steering) according to the generated route. For example, path planning controller 333 can generate a route for mobile machine 100 at a field based on the predictive values (e.g., predictive mass flow values or predictive yield values) in the map 264 or 265 and the follow-on machine and operation data 270 such that mobile machine 100 can generate windrows as desired for the follow-on machine and operation.

Zone controller 336 illustratively generates control signals to control one or more controllable subsystems 316 to control operation of the one or more controllable subsystems based on the predictive control zone map 265.

Other controllers 337 included on the mobile machine 100, or at other locations in agricultural system 300, can control other subsystems based on one or more of the predictive map 264, the predictive control zone map 265, and the predictive model 311.

While the illustrated example of FIG. 3 shows that various components of agricultural system architecture 300 are located on mobile machine 100, it will be understood that in other examples one or more of the components illustrated on mobile machine 100 in FIG. 2 can be located at other locations, such as one or more remote computing systems 368. For instance, one or more of data stores 302, map selector 309, predictive model generator 310, predictive model 311, predictive map generator 312, functional predictive maps 263 (e.g., 264 and 265), and control zone generator 313, can be located remotely from mobile machine 100 but can communicate with mobile machine 100 via communication system 306 and network 359. Thus, the predictive models 311 and functional predictive maps 263 may be generated at remote locations away from mobile machine 100 and can be communicated to mobile machine 100 over network 359. For example, communication system 306 can download the predictive models 311 and functional predictive maps 263 from the remote locations and store them in data store 302. In other examples, mobile machine 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations. These are merely examples.

In some examples, control system 314 can be located remotely from mobile machine 100 such as at one or more of remote computing systems 368 and remote user interface mechanisms 364. In other examples, a remote location, such as remote computing systems 368 or user interface mechanisms 364, or both, may include a respective control system which generates control values that can be communicated to mobile machine 100 and used by on-board control system 314 to control the operation of mobile machine 100. These are merely examples.

Figure 4:
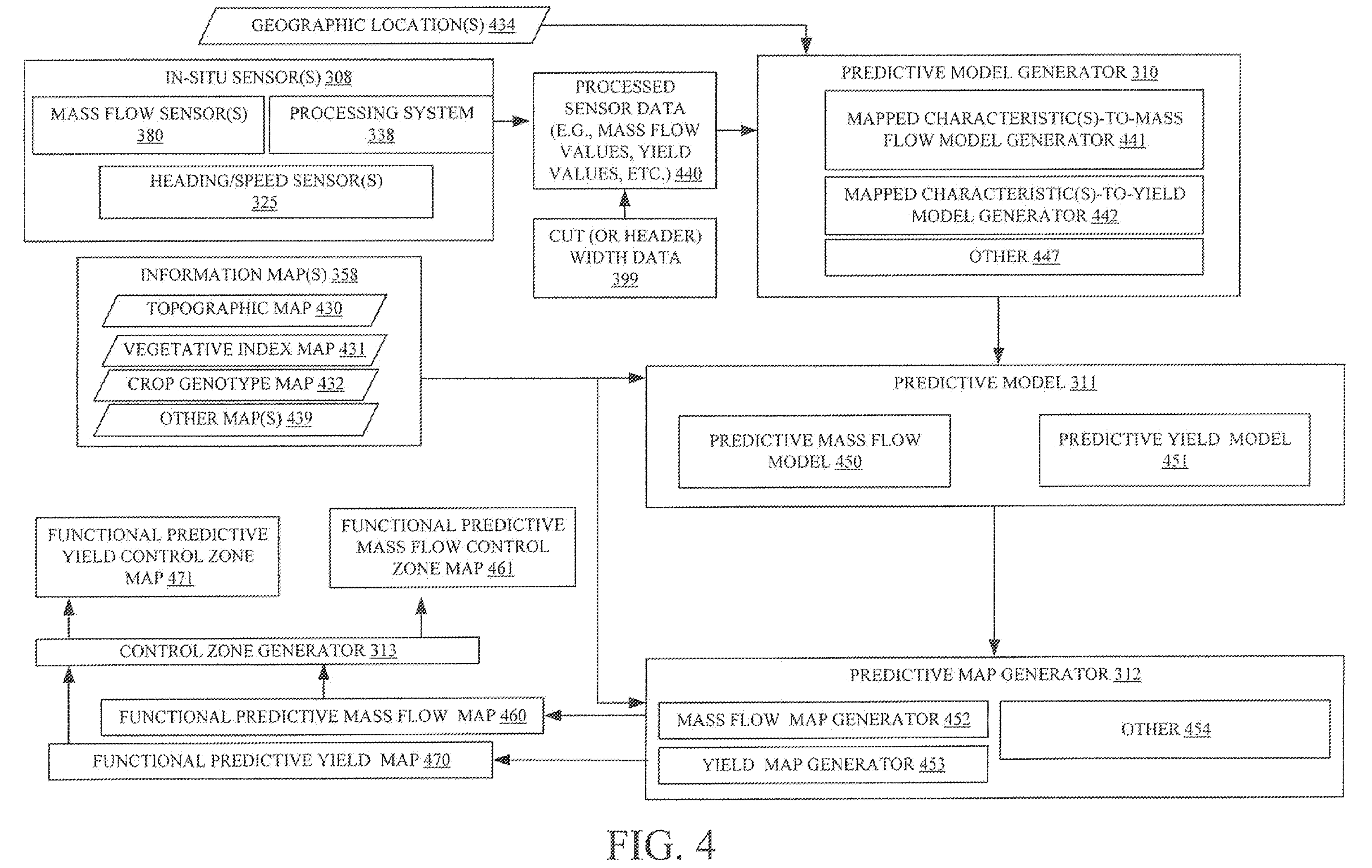
FIG. 4 is a block diagram showing one example of a predictive model generator and predictive map generator.

FIG. 4 is a block diagram of a portion of the agricultural system architecture 300 shown in FIG. 3. Particularly, FIG. 4 shows, among other things, examples of the predictive model generator 310 and the predictive map generator 312 in more detail. FIG. 4 also illustrates information flow among the various components shown. The predictive model generator 310 receives one or more (or two or more) of a topographic map 430, a vegetative index (VI) map 431, a crop genotype map 432, and another type of map 439. Predictive model generator 310 also receives one or more geographic locations 434, or an indication of one or more geographic locations, from a geographic position sensor 304, indicative of one or more geographic locations at the field corresponding to values detected by in-situ sensors 308. In-situ sensors 308 illustratively mass flow sensors 380, heading/speed sensors 325, as well as a processing system 338. The processing system 338 processes sensor data generated from mass flow sensors 380 to generate processed sensor data 440 indicative of mass flow values. In some examples, processing system 338 processes mass flow sensor data generated from mass flow sensors 380, speed sensor data from heading/speed sensors 325, and cut (or header) width data 399 to generate processed sensor data 440 indicative of yield values. While the example shown in FIG. 4 illustrates processing system 338 as a component of in-situ sensors 308, in other examples, such as the example shown in FIG. 3, processing system 338 can be separate from in-situ sensors 308 but in operative communication with in-situ sensors 308.

It will be understood that in some examples, the geographic location at which the machine 100 is located when the sensor 308 detects a value is not the location at the field to which the detected value corresponds. For example, there may be a delay between the time a crop is engaged by the machine 100 and the time at which that crop is detected by the mass flow sensors 380. Thus, the location at the field to which the mass flow value corresponds may be behind the machine 100, relative to its route or direction of travel. Thus, the geographic position detected by geographic position sensor 304 at the time the mass flow is detected may not be the location on the field to which the mass flow corresponds. Accordingly, processing system 338 can generate a geographic location 434 indicative of the location on the field to which the mass flow value (or yield value) corresponds based on sensor data from geographic position sensor 304, the heading or route of mobile machine 100, and the speed of mobile machine 100. The heading and speed may be indicated by sensor data generated by heading/speed sensors 325 or may be provided in other ways. In some examples, a crop processing delay may also be factored in. The crop processing delay can be a stored value (e.g., stored in data store 302) or can be derived based on operating parameters of the mobile machine 100. The crop processing delay can be additionally used in generating the geographic locations 434. It will be understood that the geographic locations 434 in FIG. 4 are geographic locations at the field to which the values in processed sensor data 440 correspond.

As shown in FIG. 4, the example predictive model generator 310 includes a mapped characteristic(s)-to-mass flow model generator 441 and a mapped characteristic(s)-to-yield model generator 442. In other examples, the predictive model generator 310 may include additional, fewer, or different components than those shown in the example of FIG. 4. Consequently, in some examples, the predictive model generator 310 may include other items 447 as well, which may include other types of predictive model generators to generate other types of models.

Mapped characteristic(s)-to-mass flow model generator 441 identifies a relationship between mass flow detected in in-situ sensor data 440, corresponding to a geographic location and one or more (or two or more) mapped characteristic values (one or more (or two or more) of topographic characteristic values, vegetative index (VI) values, crop genotype values, and other characteristic values) from the one or more (or two or more) information maps 358 corresponding to the same location. Based on this relationship established by mapped characteristic(s)-to-mass flow model generator 441, mapped characteristic(s)-to-mass flow model generator 441 generates a predictive mass flow model. The predictive mass flow model generated by mapped characteristic(s)-to-mass flow model generator 441 is used by mass flow map generator 452 to predict mass flow (mass flow values) at different locations in the worksite based upon the georeferenced values of one or more (or two or more) mapped characteristics contained in the one or more (or two or more) information maps 358 at the same locations in the worksite. Thus, for a given location in the worksite, a mass flow value can be predicted at the given location based on the predictive mass flow model generated by mapped characteristic(s)-to-mass flow model generator 441 and one or more (or two or more) of the topographic characteristic value from the topographic map 430, the VI value from the VI map 431, the crop genotype value from the crop genotype map 432, and the other characteristic value from the other map 439, at that given location.

In light of the above, the predictive model generator 310 is operable to produce a plurality of different predictive mass flow models. In one example, the predictive mass flow model may predict mass flow based upon one or more (or two or more) of the topographic characteristic values, the VI values, the crop genotype values, and the other characteristic values. Any of these mass flow models are represented collectively by predictive mass flow model 450 in FIG. 4. Predictive mass flow model 450 is an example of a predictive model 311.

The predictive mass flow model 450 is provided to predictive map generator 312. In the example of FIG. 4, predictive map generator 312 includes a mass flow map generator 452. In other examples, predictive map generator 312 may include additional or different map generators. Thus, in some examples, predictive map generator 312 may include other items 454 which may include other types of map generators to generate other types of maps.

Mass flow map generator 452 receives one or more (or two or more) of the topographic map 430, the VI map 431, the crop genotype map 432, and an other map 439, along with the predictive mass flow model 450 which predicts mass flow based upon one or more (or two or more) of, a topographic characteristic value, a vegetative index value, a crop genotype value, and an other characteristic value and generates a predictive map that maps predictive mass flow values at different locations in the worksite.

Predictive map generator 312 outputs a functional predictive mass flow map 460 that is predictive of mass flow. The functional predictive mass flow map 460 is a predictive map 264. The functional predictive mass flow map 460 predicts mass flow values at different locations in a worksite. The functional predictive mass flow map 460 may be provided to control zone generator 313, control system 314, or both. Control zone generator 313 generates control zones and incorporates those control zones into the functional predictive mass flow map 460 to produce a predictive control zone map 265, that is, a functional predictive mass flow control zone map 461. One or both of functional predictive mass flow map 460 and functional predictive mass flow control zone map 461 can be provided to control system 314, which generates control signals to control one or more of the controllable subsystems 316 based upon the functional predictive mass flow map 460, the functional predictive mass flow control zone map 461, or both. Alternatively, or additionally, one or more of the functional predictive mass flow map 460 and functional predictive mass flow control zone map 461 can be provided to operator 360 on an operator interface mechanism 318 or to a remote user 366 on a user interface mechanism 364, or both. Alternatively, or additionally, one or more of the functional predictive mass flow map 460 and functional predictive mass flow control zone map 461 can be provided to one or more other machines 369 (e.g., one or more follow-on machines) and can be used by the one or more other machines 369 (e.g., one or more follow-on machines) for control Mapped characteristic(s)-to-yield model generator 442 identifies a relationship between yield detected in in-situ sensor data 440, corresponding to a geographic location and one or more (or two or more) mapped characteristic values (one or more (or two or more) of topographic characteristic values, vegetative index (VI) values, crop genotype values, and other characteristic values) from the one or more (or two or more) information maps 358 corresponding to the same location. Based on this relationship established by mapped characteristic(s)-to-yield model generator 442, mapped characteristic(s)-to-yield model generator 442 generates a predictive yield model. The predictive yield model generated by mapped characteristic(s)-to-yield model generator 441 is used by yield map generator 453 to predict yield (yield values) at different locations in the worksite based upon the georeferenced values of one or more (or two or more) mapped characteristics contained in the one or more (or two or more) information maps 358 at the same locations in the worksite. Thus, for a given location in the worksite, a yield value can be predicted at the given location based on the predictive yield model generated by mapped characteristic(s)-to-yield model generator 442 and one or more (or two or more) of the topographic characteristic value from the topographic map 430, the VI value from the VI map 431, the crop genotype value from the crop genotype map 432, and the other characteristic value from the other map 439, at that given location.

In light of the above, the predictive model generator 310 is operable to produce a plurality of different predictive yield models. In one example, the predictive yield model may predict yield based upon one or more (or two or more) of the topographic characteristic values, the VI values, the crop genotype values, and the other characteristic values. Any of these yield models are represented collectively by predictive yield model 451 in FIG. 4. Predictive yield model 451 is an example of a predictive model 311.

The predictive yield model 451 is provided to predictive map generator 312. In the example of FIG. 4, predictive map generator 312 includes a yield map generator 453. In other examples, predictive map generator 312 may include additional or different map generators. Thus, in some examples, predictive map generator 312 may include other items 454 which may include other types of map generators to generate other types of maps.

Yield map generator 453 receives one or more (or two or more) of the topographic map 430, the VI map 431, the crop genotype map 432, and an other map 439, along with the predictive yield model 451 which predicts yield based upon one or more (or two or more) of, a topographic characteristic value, a vegetative index value, a crop genotype value, and an other characteristic value and generates a predictive map that maps predictive yield values at different locations in the worksite.

Predictive map generator 312 outputs a functional predictive yield map 470 that is predictive of yield. The functional predictive yield map 470 is a predictive map 264. The functional predictive yield map 470 predicts yield values at different locations in a worksite. The functional predictive yield map 470 may be provided to control zone generator 313, control system 314, or both. Control zone generator 313 generates control zones and incorporates those control zones into the functional predictive yield map 470 to produce a predictive control zone map 265, that is, a functional predictive yield control zone map 471. One or both of functional predictive yield map 470 and functional predictive yield control zone map 471 can be provided to control system 314, which generates control signals to control one or more of the controllable subsystems 316 based upon the functional predictive yield map 470, the functional predictive yield control zone map 471, or both. Alternatively, or additionally, one or more of the functional predictive yield map 470 and functional predictive yield control zone map 471 can be provided to operator 360 on an operator interface mechanism 318 or to a remote user 366 on a user interface mechanism 364, or both. Alternatively, or additionally, one or more of the functional predictive yield map 470 and functional predictive yield control zone map 471 can be provided to one or more other machines 369 (e.g., one or more follow-on machines) and can be used by the one or more other machines 369 (e.g., one or more follow-on machines) for control FIGS. 5A-5B (collectively referred to herein as FIG. 5) show a flow diagram illustrating one example of the operation of agricultural system architecture 300 in generating a predictive model and a predictive map.

At block 502, agricultural system 300 receives one or more (or two or more) information maps 358. Examples of information maps 358 or receiving information maps 358 are discussed with respect to blocks 504, 506, 508, and 509. As discussed above, information maps 358 map values of a variable, corresponding to a characteristic, to different locations in the field, as indicated at block 506. As indicated at block 504, receiving the information maps 358 may involve map selector 309, operator 360, or a user 364 selecting one or more (or two or more) of a plurality of possible information maps 358 that are available. For instance, one information map 358 may be a topographic map, such as topographic map 430. Another information map 358 may be a vegetative index (VI) map, such as VI map 431. Another information map 358 may be a crop genotype map, such as crop genotype map 432. Other types of information maps 358 that map other characteristics (or values thereof) are also contemplated, such as other maps 439. The process by which one or more (or two or more) information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. In other examples, and as described above, the information maps 358 may be predictive maps having predictive values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 509 in the flow diagram of FIG. 5.

As mobile machine 100 is operating, in-situ sensors 308 generate sensor data indicative of one or more in-situ data values indicative of a characteristic, as indicated by block 510. For example, mass flow sensors 380 generate sensor data indicative of one or more in-situ data values indicative of mass flow, as indicated by block 511. In another example, mass flow sensors 380 and heading/speed sensors 325 generate sensor data indicative of (usable to derive) yield values, as indicated by block 512. In some examples, data from in-situ sensors 308 is georeferenced to a location at the field to which the value detected by the sensors 308 corresponds using the position of mobile machine 100, the heading or route of mobile machine 100, the speed of mobile machine 100, and the crop processing delay. Other in-situ sensors 308 can also generate sensor signals of one or more in-situ data values indicative of characteristics, as indicated by block 513.

At block 514 predictive model generator 310 generates a predictive model 311 that models a relationship between the characteristics in the information map(s) 358 and the characteristic sensed by the in-situ sensor(s) 308 (e.g., mass flow) or the characteristic indicated by the sensor data (e.g., yield).

In one example at block 514, predictive model generator 310 controls the mapped characteristic(s)-to-mass flow model generator 441 to generate a model that models the relationship between the mapped values, such as one or more (or two or more) of the topographic characteristic values, the VI values, the crop genotype values, and other mapped characteristic values contained in the respective information map 358 and the in-situ values (mass flow values) sensed by the in-situ sensors 308 (mass flow sensors 380). Predictive model generator 310 generates a predictive mass flow model 450 as indicated by block 515.

In another example at block 514, predictive model generator 310 controls the mapped characteristic(s)-to-yield model generator 442 to generate a model that models the relationship between the mapped values, such as one or more (or two or more) of the topographic characteristic values, the VI values, the crop genotype values, and other mapped characteristic values contained in the respective information map 358 and the in-situ values (yield values) indicated by (derived from) the sensor data generated in-situ sensors 308 (mass flow sensors 380 and heading/speed sensors 325). Predictive model generator 310 generates a predictive yield model 450 as indicated by block 516.

At block 517, the relationship or model generated by predictive model generator 310 is provided to predictive map generator 312. Predictive map generator 312 generates a functional predictive map based on the relationship or model generated by predictive model generator 310 and the one or more information maps 358.

In one example at block 517, predictive map generator 312 controls predictive mass flow map generator 452 to generate a functional predictive mass flow map 460 that predicts mass flow (or sensor value(s) indictive of mass flow) at different geographic locations in a worksite at which mobile machine 100 is operating using the predictive mass flow model 450 and one or more (or two or more) of the information maps 358, such as one or more (or two or more) of the topographic map 430, the VI map 431, the crop genotype map 432, and other map(s) 439 as indicated by block 518.

It should be noted that, in some examples, the functional predictive mass flow map 460 may include two or more different map layers. Each map layer may represent a different data type, for instance, a functional predictive mass flow map 460 that provides two or more of a map layer that provides predictive mass flow based on topographic characteristic values from topographic map 430, a map layer that provides predictive mass flow based on VI values from VI map 431, a map layer that provides predictive mass flow based on crop genotype values from crop genotype map 432, and a map layer that provides predictive mass flow based on one or more other mapped characteristic values from one or more other maps 439. Alternatively, or additionally, functional predictive mass flow map 460 may include a map layer that provides predictive mass flow based on two or more of topographic characteristic values from topographic map 430, VI values from VI map 431, crop genotype values from crop genotype map 432, and one or more other mapped characteristic values from one or more other maps 439. Various other combinations are also contemplated.

In one example at block 517, predictive map generator 312 controls predictive yield map generator 453 to generate a functional predictive yield map 470 that predicts yield (or sensor value(s) indictive of yield) at different geographic locations in a worksite at which mobile machine 100 is operating using the predictive yield model 451 and one or more (or two or more) of the information maps 358, such as one or more (or two or more) of the topographic map 430, the VI map 431, the crop genotype map 432, and other map(s) 439 as indicated by block 519.

It should be noted that, in some examples, the functional predictive yield map 470 may include two or more different map layers. Each map layer may represent a different data type, for instance, a functional predictive yield map 470 that provides two or more of a map layer that provides predictive yield based on topographic characteristic values from topographic map 430, a map layer that provides predictive yield based on VI values from VI map 431, a map layer that provides predictive yield based on crop genotype values from crop genotype map 432, and a map layer that provides predictive yield based on one or more other mapped characteristic values from one or more other maps 439. Alternatively, or additionally, functional predictive yield map 470 may include a map layer that provides predictive yield based on two or more of topographic characteristic values from topographic map 430, VI values from VI map 431, crop genotype values from crop genotype map 432, and one or more other mapped characteristic values from one or more other maps 439. Various other combinations are also contemplated.

At block 520, predictive map generator 312 configures the functional predictive mass flow map 460 or the functional predictive yield map 470 so that the functional predictive mass flow map 460 or the functional predictive yield map 470 is actionable (or consumable) by control system 314. Predictive map generator 312 can provide the functional predictive mass flow map 460 or the functional predictive yield map 470 to the control system 314 or to control zone generator 313, or both. Some examples of the different ways in which the functional predictive mass flow map 460 or the functional predictive yield map 470 can be configured or output are described with respect to blocks 520, 521, 522, and 523. For instance, in one example, predictive map generator 312 configures functional predictive mass flow map 460 so that functional predictive mass flow map 460 includes values that can be read by control system 314 and used as the basis for generating control signals for one or more of the different controllable subsystems 316 of mobile machine 100, as indicated by block 520. In another example, predictive map generator 312 configures functional predictive yield map 470 so that functional predictive yield map 470 includes values that can be read by control system 314 and used as the basis for generating control signals for one or more of the different controllable subsystems 316 of mobile machine 100, as indicated by block 520.

In one example, at block 521, control zone generator 313 can divide the functional predictive mass flow map 460 into control zones based on the values on the functional predictive mass flow map 460 to generate functional predictive mass flow control zone map 461. In another example, at block 521, control zone generator 313 can divide the functional predictive yield map 470 into control zones based on the values on the functional predictive yield map 470 to generate functional predictive yield control zone map 471.

Contiguously-geolocated values that are within a threshold value of one another can be grouped into a control zone. The threshold value can be a default threshold value, or the threshold value can be set based on an operator or user input, based on an input from an automated system, or based on other criteria. A size of the zones may be based on a responsiveness of the control system 314, the controllable subsystems 316, based on wear considerations, or on other criteria.

In one example, at block 522, predictive map generator 312 configures functional predictive mass flow map 460 for presentation to an operator or other user. In another example, at block 522, control zone generator 313 can configure functional predictive mass flow control zone map 461 for presentation to an operator or other user. In another example, at block 522, predictive map generator 312 configures functional predictive yield map 470 for presentation to an operator or other user. In another example, at block 522, control zone generator 313 can configure functional predictive yield control zone map 471 for presentation to an operator or other user.

When presented to an operator or other user, the presentation of the functional predictive map or of the functional predictive control zone map, or both, may contain one or more of the predictive values on the functional predictive map correlated to geographic location, the control zones of functional predictive control zone map correlated to geographic location, and settings values or control parameters that are used based on the predicted values on the functional predictive map or control zones on the functional predictive control zone map. The presentation can, in another example, include more abstracted information or more detailed information. The presentation can also include a confidence level that indicates an accuracy with which the predictive values on the functional predictive map or the control zones on the functional predictive control zone map conform to measured values that may be measured by sensors on mobile machine 100 as mobile machine 100 operates at the field. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the functional predictive map or functional predictive control zone map, or both, or make any changes to machine operation. A supervisor, such as a supervisor at a remote location, however, may be able to see the functional predictive map or functional predictive control zone map, or both, on the display but be prevented from making any changes. A manager, who may be at a separate remote location, may be able to see all of the elements on the functional predictive map or functional predictive control zone map, or both, and also be able to change the functional predictive map or functional predictive control zone map, or both. In some instances, the functional predictive map or functional predictive control zone map, or both, accessible and changeable by a manager located remotely, may be used in machine control. This is one example of an authorization hierarchy that may be implemented. The functional predictive map(s) or functional predictive control zone map(s), or both, can be configured in other ways as well, as indicated by block 523.

At block 524, input from geographic position sensor 304 and other in-situ sensors 308 and follow-on machine and operation data 270 are received by the control system 314. Particularly, at block 526, control system 314 detects an input from the geographic position sensor 304 identifying a geographic location of mobile machine 100. Block 527 represents receipt by the control system 314 of sensor inputs indicative of trajectory or heading of mobile machine 100, and block 528 represents receipt by the control system 314 of a speed of mobile machine 100. Block 530 represent receipt by the control system 314 of follow-on machine and operation data 270. Block 531 represents receipt by the control system 314 of various other information, such as various other information from various in-situ sensors 308 or various other data.

At block 532, control system 314 generates control signals to control the controllable subsystems 316 based on a functional predictive map (e.g., 460 or 470) or a functional predictive control zone map (e.g., 470 or 471), or both, and one or more of the input from the geographic position sensor 304, the heading of the mobile machine 100 as provided by heading/speed sensors 325 or a route of the mobile machine 100, the speed of the mobile machine as provided by heading/speed sensors 325, the follow-on machine and operation data 270, and any other data or information. At block 534, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive map or functional predictive control zone map or both that is being used. Similarly, the control signals that are generated and the controllable subsystems 316 that are controlled and the timing of the control signals can be based on various latencies of mobile machine 100 and the responsiveness of the controllable subsystems 316. Additionally, it will be understood that the timing of the control signals can be based on the travel speed of the mobile machine 100, the location of the mobile machine 100, the heading of the mobile machine 100, as well as latencies of the system.

At block 536, a determination is made as to whether the operation has been completed. If the operation is not completed, the processing advances to block 538 where in-situ sensor data from geographic position sensor 304, heading/speed sensors 325, other in-situ sensors 308 (and perhaps other sensors), and various other data (e.g., follow-on machine and operation data 270) continue to be obtained.

In some examples, at block 540, agricultural system 300 can also detect learning trigger criteria to perform machine learning on one or more of the functional predictive map(s) (e.g., 460 or 470, or both), the functional predictive control zone map(s) (e.g., 461 or 471, or both), the predictive model(s) (e.g., 450 or 451, or both), the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data is obtained from in-situ sensors 308. In such examples, receipt of an amount of in-situ sensor data from the in-situ sensors 308 that exceeds a threshold trigger or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new predictive model generated by predictive model generator 310. Further, a new functional predictive map, a new functional predictive control zone map, or both, can be generated using the new predictive model. Block 542 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more (or two or more) information maps 358) are within a selected range or is less than a defined amount, or below a threshold value, then a new predictive model is not generated by the predictive model generator 310. As a result, the predictive map generator 312 does not generate a new functional predictive map, a new functional predictive control zone map, or both. However, if variations within the in-situ sensor data are outside of the selected range, are greater than the defined amount, or are above the threshold value, for example, then the predictive model generator 310 generates a new predictive model using all or a portion of the newly received in-situ sensor data that the predictive map generator 312 uses to generate a new functional predictive map which can be provided to control zone generator 313 for the creation of a new functional predictive control zone map. At block 544, variations in the in-situ sensor data, such as a magnitude of an amount by which the data exceeds the selected range or a magnitude of the variation of the relationship between the in-situ sensor data and the information in the one or more (or two or more) information maps, can be used as a trigger to cause generation of one or more of a new predictive model, a new functional predictive map, and a new functional predictive control zone map. Keeping with the examples described above, the threshold, the range, and the defined amount can be set to default values; set by an operator or user interaction through an interface mechanism; set by an automated system; or set in other ways.

Other learning trigger criteria can also be used. For instance, if predictive model generator 310 switches to a different information map or different combination of information maps (different from the originally selected information map or from the originally selected combination of information maps), then switching to the different information map or combination of information maps may trigger re-learning by predictive model generator 310, predictive map generator 312, control zone generator 313, control system 314, or other items. In another example, transitioning of mobile machine 100 to a different area of the field or to a different control zone may be used as learning trigger criteria as well.

In some instances, operator 360 or a user 366 can also edit the functional predictive map or functional predictive control zone map or both. The edits can change a value on the functional predictive map, change a size, shape, position, or existence of a control zone on functional predictive control zone map, or both. Block 546 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to relearn predictive model, predictive map generator 312 to generate a new functional predictive map, control zone generator 313 to generate a new functional predictive control zone map, and control system 314 to relearn a control algorithm or to perform machine learning on one or more of the controller components 329 through 337 in control system 314 based upon the adjustment by the operator 360 or user 366, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, and control system 314 performs machine learning to generate a new predictive model, a new functional predictive map, a new control zone or new functional predictive control zone map, and a new control algorithm, respectively, based upon the learning trigger criteria or based upon the passage of a time interval. The new predictive model, the new functional predictive maps, the new control zone or new functional predictive control zone map, and the new control algorithm are generated using any additional data that has been collected since the last learning operation was performed. Performing relearning is indicated by block 552.

If the operation has not been completed, operation moves from block 552 to block 520 such that the new predictive model, the new functional predictive map, the new control zone or new functional predictive control zone map, and/or the new predictive control algorithms can be used to control mobile machine 100. If the operation has been completed, operation moves from block 552 to block 554 where one or more of the functional predictive map, functional predictive control zone map, the predictive model, control zone(s), and control algorithm(s), are stored. The functional predictive map, the functional predictive control zone map, the predictive model, the control zone(s), and the control algorithm(s) may be stored locally on data store 302 or sent to a remote system using communication system 306 for later use.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or at the same worksite at a future time.

The revision of the model in response to new data may employ machine learning methods. Without limitation, machine learning methods may include memory networks, Bayes systems, decisions trees, Cluster Analysis, Eigenvectors, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite not yet operated at during the current operation (e.g., uncut areas during the current operation) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more (or two or more) maps of the field are obtained, such as one or more (or two or more) of a topographic map, a vegetative index (VI) map, a crop genotype map, and one or more other types of maps.

In-situ sensors generate sensor data indicative of in-situ characteristic values, such as in-situ mass flow values or in-situ yield values.

A predictive model generator generates one or more predictive models based on the one or more (or two or more) obtained maps and the in-situ sensor data, such as a predictive mass flow model or a predictive yield model.

A predictive map generator generates one or more functional predictive maps based on a model generated by the predictive model generator and the one or more (or two or more) obtained maps. For example, the predictive map generator may generate a functional predictive mass flow map that maps predictive mass flow values to one or more locations on the worksite based on a predictive mass flow model and the one or more (or two or more) obtained maps. In another example, the predictive map generator may generate a functional predictive yield map that maps predictive yield values to one or more locations on the worksite based on a predictive yield model and the one or more (or two or more) obtained maps.

Control zones, which include machine settings values, can be incorporated into the functional predictive mass flow map to generate a functional predictive mass flow control zone map. Control zones, which include machine settings values, can be incorporated into the functional predictive yield map to generate a functional predictive yield control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive map(s) or the functional predictive control zone map(s), or both, are then revised based on the revised model(s) and the values in the obtained map(s).

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, generators, and interactions. It will be appreciated that any or all of such systems, components, logic, generators, and interactions may be implemented by hardware items, such as one or more processors, one or more processors executing computer executable instructions stored in memory, memory, or other processing components, some of which are described below, that perform the functions associated with those systems, components, logic, generators, or interactions. In addition, any or all of the systems, components, logic, generators, and interactions may be implemented by software that is loaded into a memory and is subsequently executed by one or more processors or one or more servers or other computing component(s), as described below. Any or all of the systems, components, logic, generators, and interactions may also be implemented by different combinations of hardware, software, firmware, etc., some examples of which are described below. These are some examples of different structures that may be used to implement any or all of the systems, components, logic, generators, and interactions described above. Other structures may be used as well.

Figure 6:
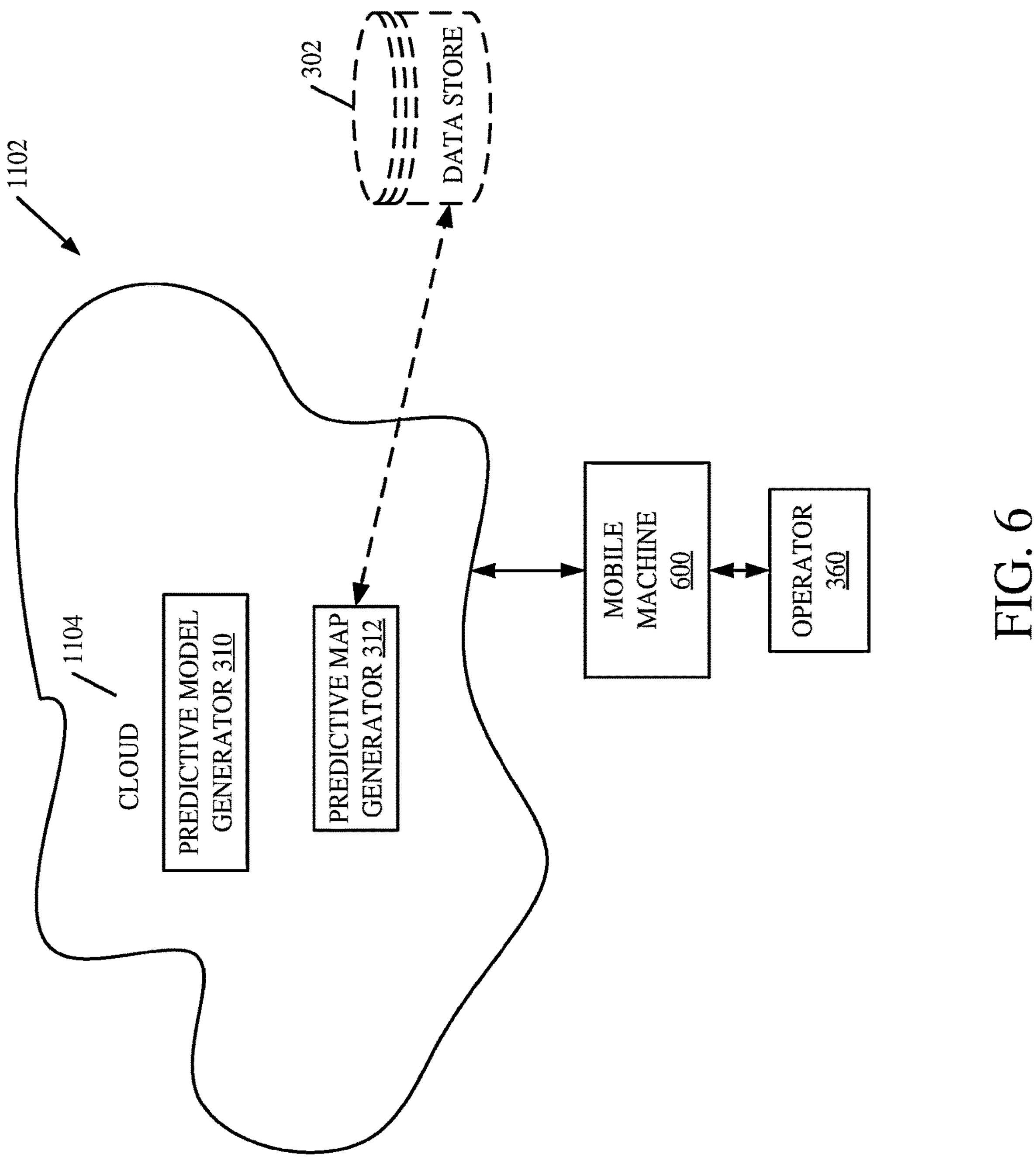
FIG. 6 is a block diagram showing one example of a mobile machine in communication with a remote server environment.

FIG. 6 is a block diagram of mobile machine 600, which may be similar to mobile machine 100 shown in FIG. 3. The mobile machine 600 communicates with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 3 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 6, some items are similar to those shown in FIG. 3 and those items are similarly numbered. FIG. 6 specifically shows that predictive model generator 310 or predictive map generator 312, or both, may be located at a server location 1004 that is remote from the mobile machine 600. Therefore, in the example shown in FIG. 6, mobile machine 600 accesses systems through remote server location 1004. In other examples, various other items may also be located at server location 1004, such as data store 302, map selector 309, predictive model 311, functional predictive maps 263 (including predictive maps 264 and predictive control zone maps 265), control zone generator 313, control system 314 (or components thereof), and processing system 338.

FIG. 6 also depicts another example of a remote server architecture. FIG. 6 shows that some elements of FIG. 3 may be disposed at a remote server location 1004 while others may be located elsewhere. By way of example, data store 302 may be disposed at a location separate from location 1004 and accessed via the remote server at location 1004. Regardless of where the elements are located, the elements can be accessed directly by mobile machine 600 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 600 comes close to the machine containing the information collection system, such as a fuel truck prior to fueling, the information collection system collects the information from the mobile machine 600 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the mobile machine 600 until the mobile machine 600 enters an area having wireless communication coverage. The mobile machine 600, itself, may send the information to another network.

It will also be noted that the elements of FIG. 3, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 7:
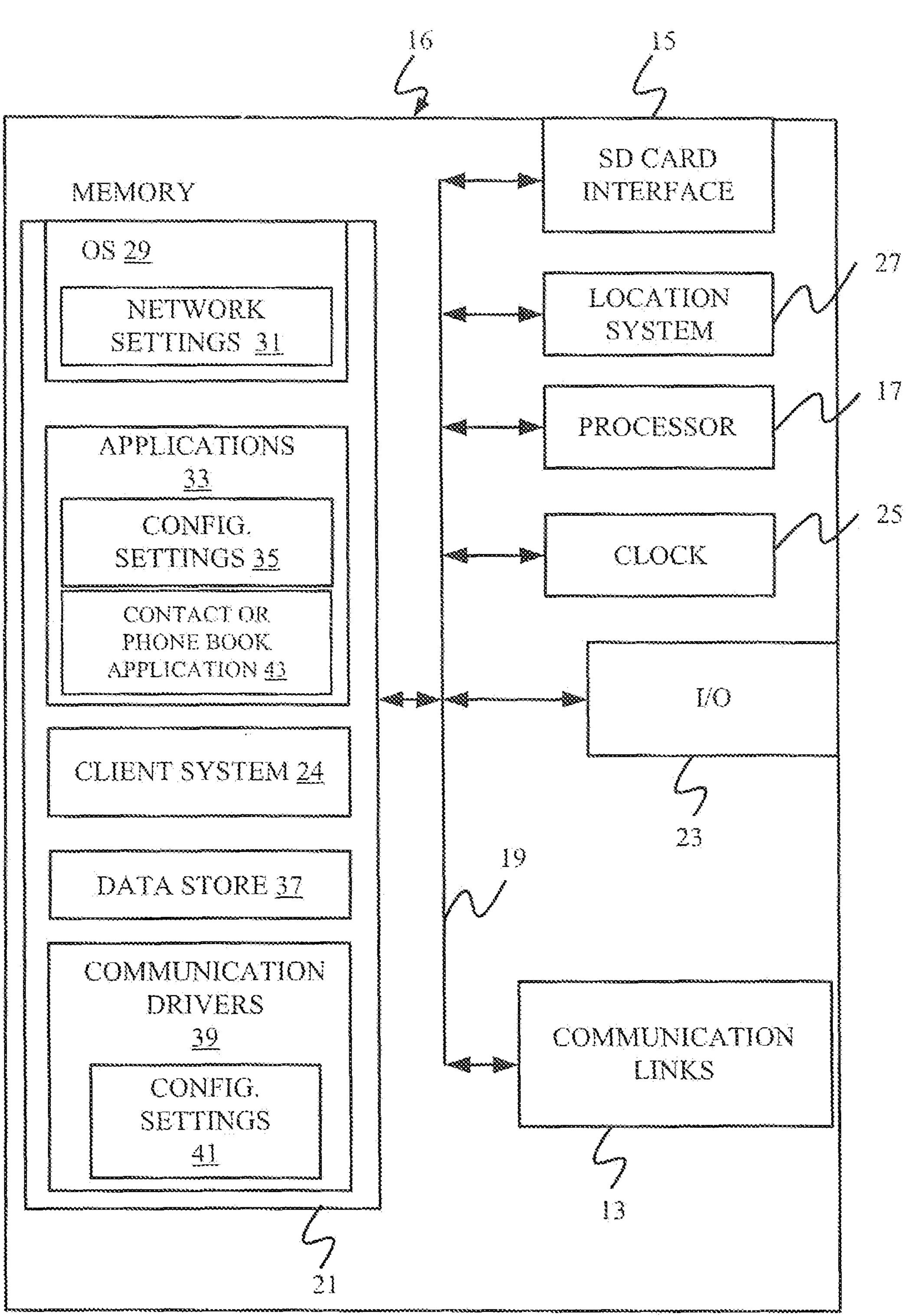
FIGS. 7-9 show examples of mobile devices that can be used in an agricultural windrowing system.
Figure 8:
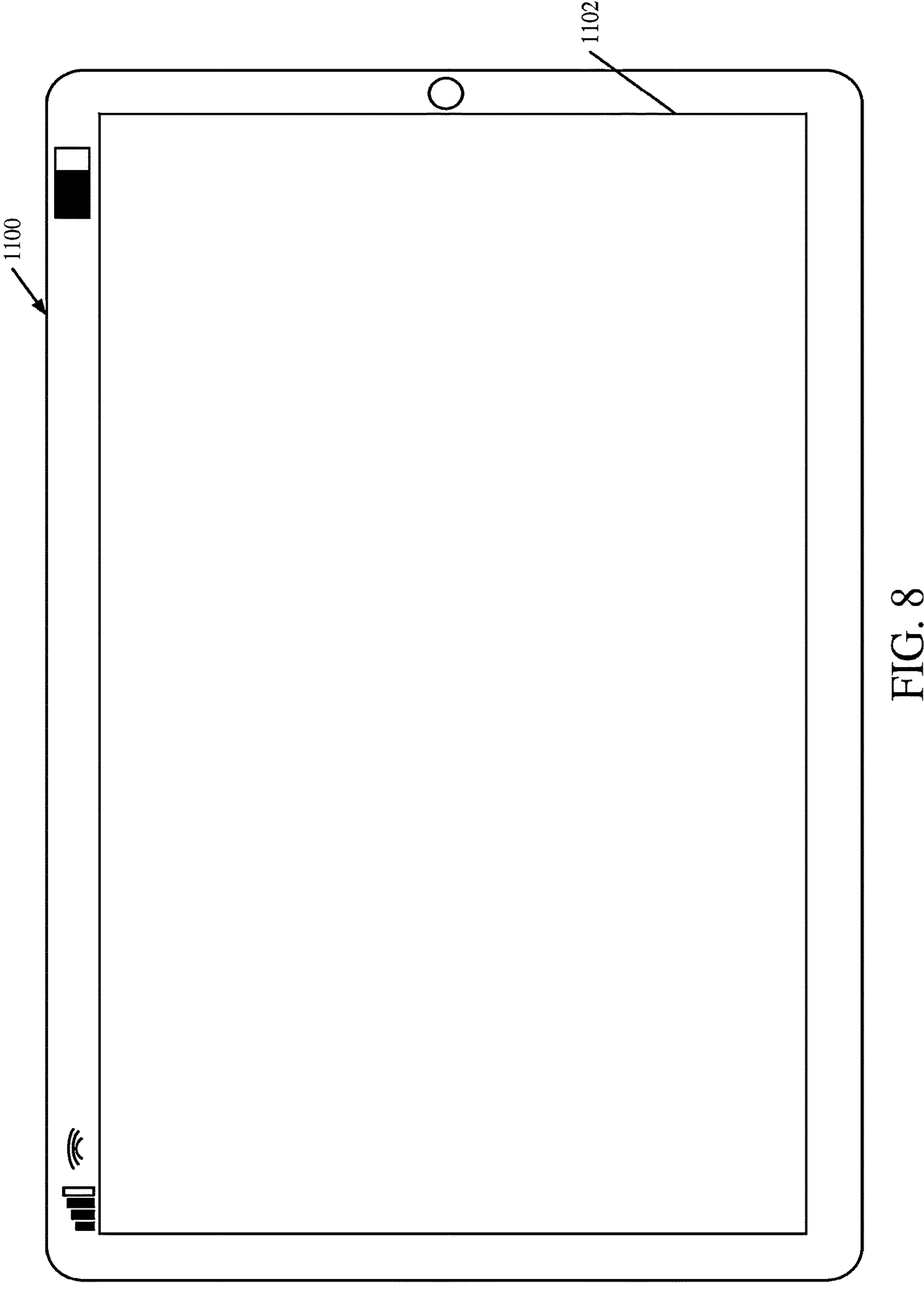
Figure 9:
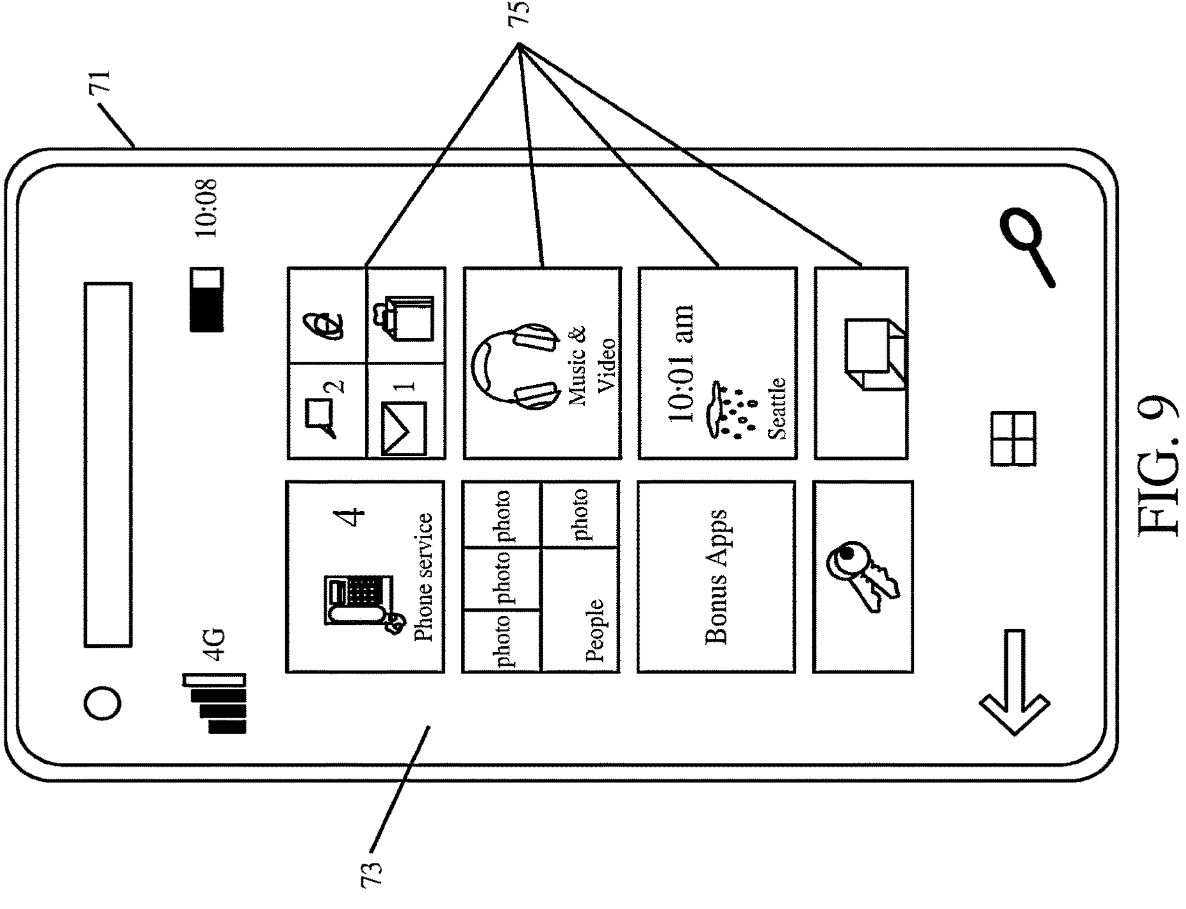

FIG. 7 is a simplified block diagram of one illustrative example of a handheld or mobile computing device that can be used as a user's or client's handheld device 16, in which the present system (or parts of it) can be deployed. For instance, a mobile device can be deployed in the operator compartment of mobile machine 100 for use in generating, processing, or displaying the maps discussed above. FIGS. 8-9 are examples of handheld or mobile devices.

FIG. 7 provides a general block diagram of the components of a client device 16 that can run some components shown in FIG. 3, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 8 shows one example in which device 16 is a tablet computer 1100. In FIG. 8, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 9 is similar to FIG. 8 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
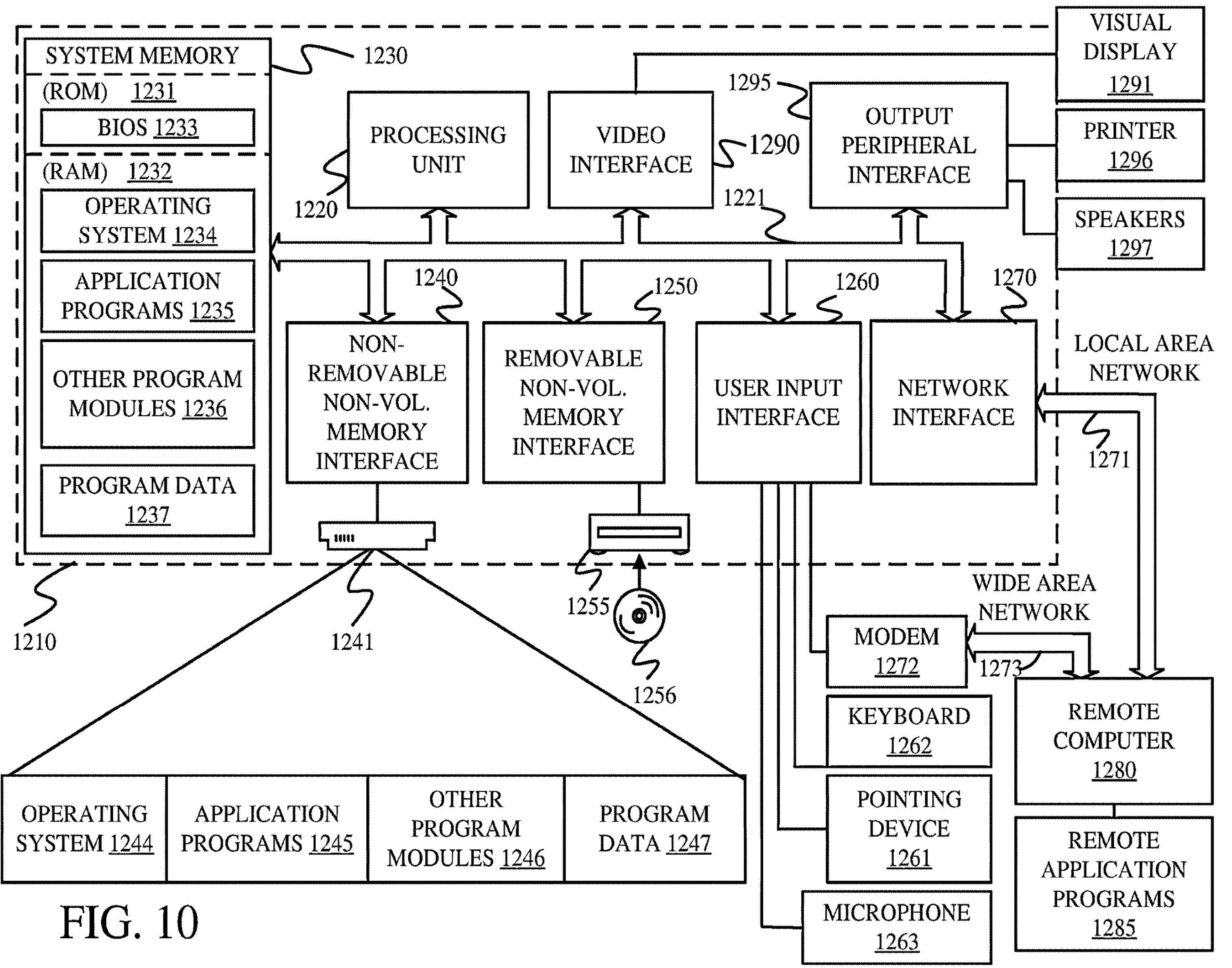
FIG. 10 is a block diagram showing one example of a computing environment that can be used in an agricultural windrowing system.

FIG. 10 is one example of a computing environment in which elements of previous figures described herein can be deployed. With reference to FIG. 10, an example system for implementing some embodiments includes a computing device in the form of a computer 1210 programmed to operate as discussed above. Components of computer 1210 may include, but are not limited to, a processing unit 1220 (which can comprise processors or servers from previous figures described herein), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 10.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 10 illustrates operating system 1234, application programs 1235, other program modules 1236, and program data 1237.

The computer 1210 may also include other removable/non-removable volatile/nonvolatile computer storage media. By way of example only, FIG. 10 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 1210. In FIG. 10, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 10 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural windrowing system comprising:

a geographic position sensor configured to detect a machine geographic location of a mobile windrowing machine;

an in-situ sensor configured to detect a value of a mass flow corresponding to a geographic location of a plurality of different geographic locations, in a worksite;

one or more processors; and memory storing instructions executable by the one or more processors that, when executed by the one or more processors, configure the one or more processors to:

obtain an information map that includes values of a first characteristic corresponding to the plurality of different geographic locations in the worksite;

generate a functional predictive map of the worksite that maps predictive values of a second characteristic to one or more geographic locations of the plurality of different geographic locations in the worksite, based, at least, on a value of the first characteristic in the information map corresponding to the geographic location in the worksite and based on the detected value of mass flow corresponding to the geographic location;

obtain follow-on machine and operation data representing operational characteristics of a follow-on machine, different than the mobile windrowing machine, configured to perform a windrow processing operation on a windrow formed by the mobile windrowing machine; and control the mobile windrowing machine to form, on the worksite, the windrow based on the functional predictive map and the follow-on machine and operation data representing the operational characteristics of the follow-on machine.

2. The agricultural windrowing system of claim 1, wherein the instructions, when executed by the one or more processors, configure the one or more processors to control the mobile windrowing machine by controlling a merger subsystem of the mobile windrowing machine based on the follow-on machine and operation data.

3. The agricultural windrowing system of claim 1, wherein the instructions, when executed by the one or more processors, configure the one or more processors to control the mobile windrowing machine by controlling at least one of a size or a position of the windrow formed by the mobile windrowing machine based on the follow-on machine and operation data.

4. The agricultural windrowing system of claim 1, wherein the mobile windrowing machine includes a merger belt, and the instructions, when executed by the one or more processors, configure the one or more processors to control the mobile windrowing machine by controlling, based on the follow-on machine and operation data, at least one of:

a direction of movement of the merger belt of the mobile windrowing machine; or a position of the merger belt of the mobile windrowing machine.

5. The agricultural windrowing system of claim 1, wherein the instructions, when executed by the one or more processors, further configure the one or more processors to:

generate a route for the mobile windrowing machine based on the functional predictive map and the follow-on machine and operation data; and control the mobile windrowing machine by controlling a steering subsystem of the mobile windrowing machine based on the route.

6. The agricultural windrowing system of claim 1 and further comprising a speed sensor configured to detect a speed of the mobile windrowing machine and wherein the instructions, when executed by the one or more processors, further configure the one or more processors to:

generate a value of yield corresponding to the geographic location based on the detected value of mass flow corresponding to the geographic location and the detected speed of the mobile windrowing machine; and generate a predictive yield model indicative of a relationship between values of the first characteristic in the information map and values of yield based, at least, on the value of yield corresponding to the geographic location and the value of the first characteristic in the information map corresponding to the geographic location to which the value of yield corresponds.

7. The agricultural windrowing system of claim 6, wherein the functional predictive map of the worksite comprises a functional predictive yield map that maps predictive values of yield, as the predictive values of the second characteristic, to the one or more geographic locations of the plurality of different geographic locations in the worksite based on values of the first characteristic in the information map corresponding to the one or more geographic locations of the plurality of different geographic locations in the worksite and based on the predictive yield model.

8. The agricultural windrowing system of claim 1, wherein the instructions, when executed by the one or more processors, further configure the one or more processors to:

generate a predictive mass flow model indicative of a relationship between values of the first characteristic in the information map and values of mass flow based, at least, on the detected value of mass flow corresponding to the geographic location and the value of the first characteristic in the information map corresponding to the geographic location to which the detected value of mass flow corresponds; and wherein the functional predictive map of the worksite comprises a functional predictive mass flow map that maps predictive values of mass flow, as the predictive values of the second characteristic, to the one or more geographic locations of the plurality of different geographic locations in the worksite based on values of the first characteristic in the information map corresponding to the one or more geographic locations of the plurality of different geographic locations in the worksite and based on the predictive mass flow model.

9. The agricultural windrowing system of claim 1, wherein the information map comprises one of:

a topographic map that maps, as the values of the first characteristic, topographic characteristic values corresponding to the plurality of different geographic locations in the worksite;

a vegetative index map that maps, as the values of the first characteristic, vegetative index values corresponding to the plurality of different geographic locations in the worksite; or a crop genotype map that maps, as the values of the first characteristic, crop genotype values corresponding to the plurality of different geographic locations in the worksite.

10. The agricultural windrowing system of claim 1, wherein the follow-on machine is different than the mobile windrowing machine and wherein the follow-on machine and operation data indicates at least one of:

(i) a type of the follow-on machine;

(ii) a capacity or capability of the follow-on machine; or (iii) a combination of (i) and (ii).

11. A computer implemented method of controlling a mobile windrowing machine, the computer implemented method comprising:

receiving an information map that maps values of a first characteristic to a plurality of different geographic locations in a worksite;

detecting, with an in-situ sensor, a value of a mass flow corresponding to a geographic location of the plurality of different geographic locations;

generating a predictive model indicative of a relationship between values of the first characteristic and values of a second characteristic based, at least, on the value of the mass flow detected by the in-situ sensor corresponding to the geographic location and a value of the first characteristic in the information map corresponding to the geographic location;

generating a functional predictive map of the worksite that maps predictive values of the second characteristic to one or more geographic locations of the plurality of different geographic locations in the worksite based on values of the first characteristic in the information map corresponding to the one or more geographic locations of the plurality of different geographic locations in the worksite and the predictive model;

obtaining follow-on machine and operation data representing operational characteristics of a follow-on machine, different than the mobile windrowing machine, configured to perform a windrow processing operation on a windrow formed by the mobile windrowing machine; and controlling the mobile windrowing machine to form, on the worksite, the windrow based on the functional predictive map and the follow-on machine and operation data representing the operational characteristics of the follow-on machine.

12. The computer implemented method of claim 11, wherein controlling the mobile windrowing machine comprises controlling a merger subsystem of the mobile windrowing machine.

13. The computer implemented method of claim 11 and further comprising:

generating a route for the mobile windrowing machine based on the functional predictive map; and wherein controlling the mobile windrowing machine comprises controlling a steering subsystem of the mobile windrowing machine based on the route.

14. The computer implemented method of claim 11, wherein generating the predictive model comprises generating a predictive mass flow model indicative of a relationship between values of the first characteristic and values of mass flow, as the second characteristic, based, at least, on the value of mass flow detected by the in-situ sensor corresponding to the geographic location and the value of the first characteristic in the information map corresponding to the geographic location; and wherein generating the functional predictive map comprises generating a functional predictive mass flow map of the worksite that maps predictive values of mass flow, as the predictive values of the second characteristic, to the one or more geographic locations of the plurality of different geographic locations in the worksite based on the values of the first characteristic in the information map corresponding to the one or more geographic locations of the plurality of different geographic locations in the worksite and the predictive mass flow model.

15. The computer implemented method of claim 11 and further comprising:

detecting, with an in-situ speed sensor, a speed of the mobile windrowing machine;

generating, with a processing system, a value of yield corresponding to the geographic location based on a cut width of the mobile windrowing machine, the detected speed of the mobile windrowing machine, and the detected value of mass flow corresponding to the geographic location; and wherein generating the predictive model comprises generating a predictive yield model indicative of a relationship between values of the first characteristic and values of yield, as the second characteristic, based, at least, on the generated value of yield corresponding to the geographic location and the value of the first characteristic in the information map corresponding to the geographic location; and wherein generating the functional predictive map comprises generating a functional predictive yield map of the worksite that maps predictive values of yield, as the predictive values of the second characteristic, to the one or more geographic locations of the plurality of different geographic locations in the worksite based on the values of the first characteristic in the information map corresponding to the one or more geographic locations of the plurality of different geographic locations and the predictive yield model.

16. A mobile agricultural windrowing machine comprising:

an in-situ mass flow sensor configured to detect a value of mass flow corresponding to a geographic location of a plurality of different geographic locations in a worksite;

one or more processors; and memory storing instructions executable by the one or more processors that, when executed by the one or more processors, cause the one or more processors to:

obtain an information map that maps values of a first characteristic to the plurality of different geographic locations in the worksite;

generate a predictive model indicative of a relationship between the first characteristic and a second characteristic based, at least, on the value of mass flow detected by the in-situ mass flow sensor corresponding to the geographic location and a value of the first characteristic in the information map corresponding to the geographic location;

generate a functional predictive map of the worksite that maps predictive values of the second characteristic to one or more geographic locations of the plurality of different geographic locations in the worksite based on values of the first characteristic in the information map corresponding to the one or more geographic locations of the plurality of different geographic locations in the worksite and based on the predictive model;

obtain follow-on machine and operation data representing operational characteristics of a follow-on machine, different than the mobile agricultural windrowing machine, configured to perform a windrow processing operation on a windrow formed by the mobile agricultural windrowing machine; and control the mobile agricultural windrowing machine to form, on the worksite, the windrow based on the functional predictive map and the follow-on machine and operation data representing the operational characteristics of the follow-on machine.

17. The mobile agricultural windrowing machine of claim 16, wherein the instructions, when executed by the one or more processors, cause the one or more processors to control the mobile agricultural windrowing machine by controlling a merger subsystem of the mobile agricultural windrowing machine.

18. The mobile agricultural windrowing machine of claim 16, wherein the instructions, when executed by the one or more processors, further cause the one or more processors to generate a route for the mobile agricultural windowing machine based on the functional predictive map and to control the mobile agricultural windrowing machine by controlling a steering subsystem of the mobile agricultural windrowing machine based on the route.

19. The mobile agricultural windrowing machine of claim 16 and further comprising a speed sensor configured to detect a speed of the mobile agricultural windrowing machine and wherein the instructions, when executed by the one or more processors, further cause the one or more processors to generate a yield value corresponding to the geographic location based on the detected value of mass flow corresponding to the geographic location and the detected speed of the mobile agricultural windrowing machine; and wherein the predictive model comprises a predictive yield model indicative of a relationship between the first characteristic and yield, as the second characteristic, based, at least, on the generated value of yield corresponding to the geographic location and the value of the first characteristic in the information map corresponding to the geographic location; and wherein the functional predictive map comprises a functional predictive yield map of the worksite that maps predictive values of yield, as the predictive values of the second characteristic, to the one or more geographic locations of the plurality of different geographic locations in the worksite based on the values of the first characteristic in the information map corresponding to the one or more geographic locations of the plurality of different geographic locations in the worksite and based on the predictive yield model.

20. The mobile agricultural windrowing machine of claim 16, wherein the predictive model comprises a predictive mass flow model indicative of a relationship between the first characteristic and mass flow, as the second characteristic, based, at least, on the detected value of mass flow corresponding to the geographic location and the value of the first characteristic in the information map corresponding to the geographic location; and wherein the functional predictive map comprises a functional predictive mass flow map of the worksite that maps predictive values of mass flow, as the predictive values of the second characteristic, to the one or more geographic locations of the plurality of different geographic locations in the worksite based on the values of the first characteristic in the information map corresponding to the one or more geographic locations of the plurality of different geographic locations in the worksite and based on the predictive mass flow model.

* * * * *